(12) United States Patent
Ninomiya et al.

(10) Patent No.: US 10,802,616 B2
(45) Date of Patent: *Oct. 13, 2020

(54) ELECTRONIC PEN

(71) Applicant: Wacom Co., Ltd., Saitama (JP)

(72) Inventors: Kenichi Ninomiya, Kanagawa (JP); Takayuki Arai, Saitama (JP); Kohei Tanaka, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/441,182

(22) Filed: Jun. 14, 2019

(65) Prior Publication Data

US 2019/0294269 A1    Sep. 26, 2019

Related U.S. Application Data

(63) Continuation of application No. 15/654,356, filed on Jul. 19, 2017, now Pat. No. 10,365,733.

(30) Foreign Application Priority Data

Jul. 25, 2016  (JP) .................... 2016-145522

(51) Int. Cl.
  *G06F 3/0354*  (2013.01)
  *H01G 5/14*    (2006.01)
  *G01L 1/14*    (2006.01)
  *G06F 3/033*   (2013.01)
  *G06F 3/048*   (2013.01)

(52) U.S. Cl.
  CPC .......... *G06F 3/03545* (2013.01); *G06F 3/033* (2013.01); *G06F 3/048* (2013.01)

(58) Field of Classification Search
  CPC ........ G06F 3/03545; G01L 1/142; H01G 5/14
  See application file for complete search history.

(56) References Cited

U.S. PATENT DOCUMENTS

| 8,350,166 | B2 | 1/2013 | Baba |
| 9,063,025 | B2 | 6/2015 | Horie et al. |
| 2010/0212976 | A1 | 8/2010 | Baba |
| 2013/0199311 | A1* | 8/2013 | Horie .................... G06F 3/0383 73/862.626 |

(Continued)

FOREIGN PATENT DOCUMENTS

| JP | 210-198193 A | 9/2010 |
| JP | 2013-161307 A | 8/2013 |
| WO | 2015/122280 A1 | 8/2015 |

*Primary Examiner* — Xuemei Zheng

(74) *Attorney, Agent, or Firm* — Seed IP Law Group LLP

(57) ABSTRACT

An electronic pen includes: a tubular casing; a rod-shaped core body that projects outside of the casing through an opening of the casing, the opening being formed on one side in axial direction of the casing; a pen pressure detector disposed within a hollow portion of the casing, wherein the pen pressure detector, in operation detects a pen pressure applied to the core body; a core body insertion member disposed between the pen pressure detector and the opening of the casing within the hollow portion of the casing, the core body insertion member housing the core body movably in the axial direction of the casing and having a hollow space closed on a side of the pen pressure detector by a barrier; and a first sealing member that separates the hollow space of the core body insertion member from the hollow portion of the casing.

17 Claims, 9 Drawing Sheets

(56) References Cited

U.S. PATENT DOCUMENTS

| | | | |
|---|---|---|---|
| 2016/0018912 A1* | 1/2016 | Kaneda | G06F 3/033 345/179 |
| 2016/0349865 A1 | 12/2016 | Arai et al. | |

\* cited by examiner

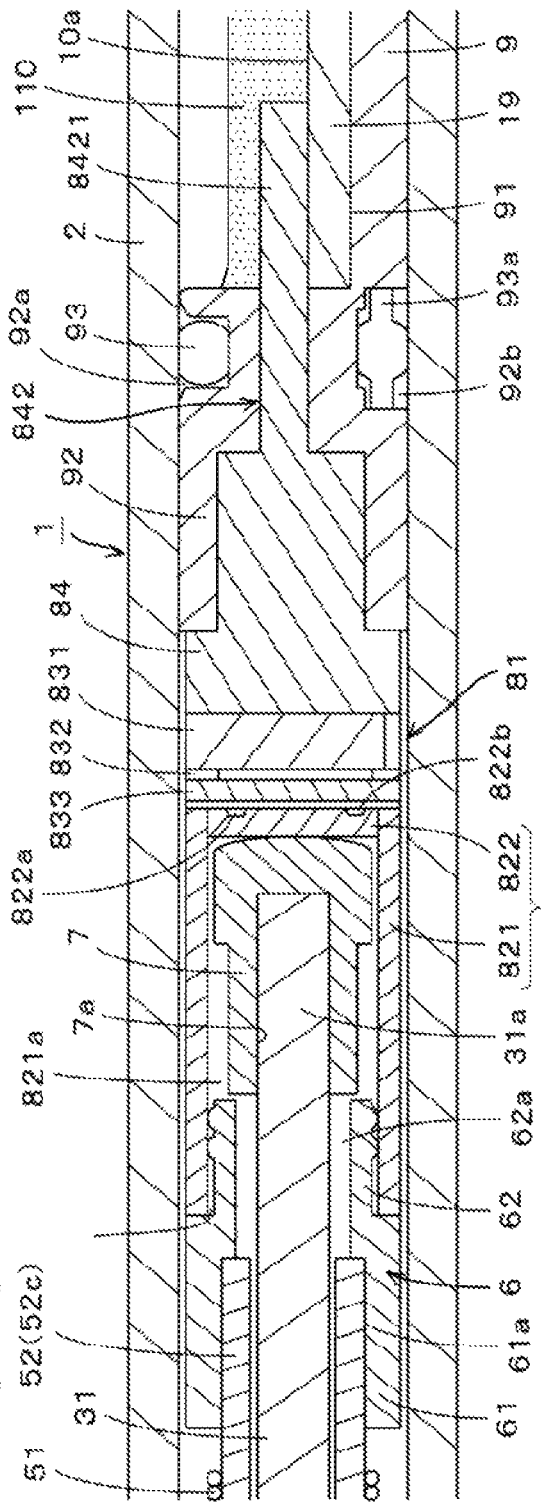
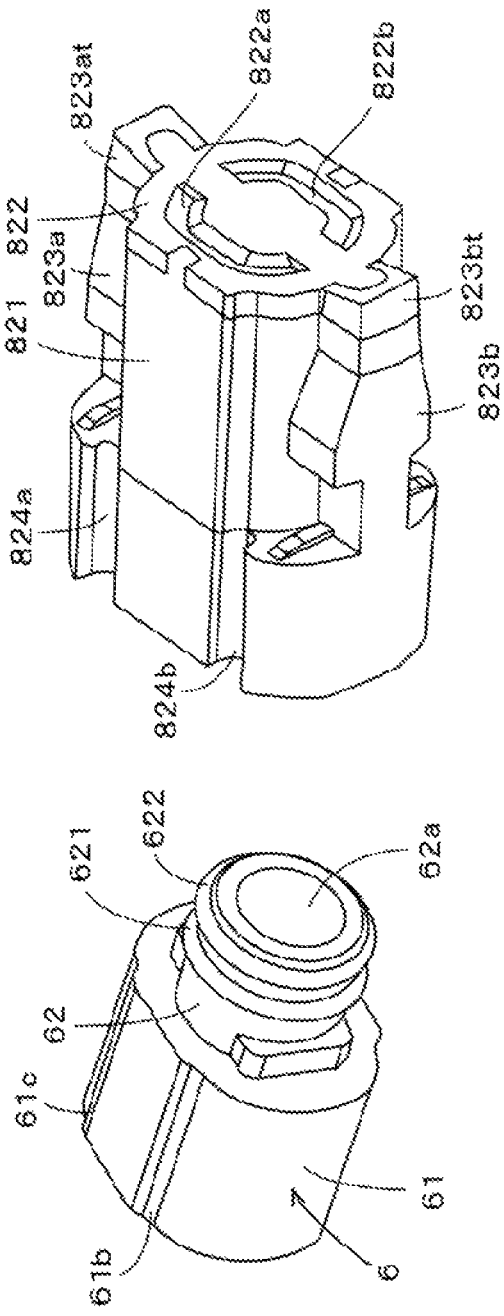

ELECTRONIC PEN

BACKGROUND

Technical Field

The present disclosure relates to an electronic pen that is used in conjunction with a position detecting device and which has a pen pressure detecting function.

Description of Related Art

Recently, as an input device for a portable tablet, a personal computer, or the like, an input device has been used which includes an electronic pen (stylus pen) constituting a position indicator and a position detecting device having an input surface that receives pointing operation and character and figure input by the electronic pen.

There are electronic pens of various types such as an electromagnetic induction type, a capacitive coupling type, and the like. However, electronic pens are generally configured to have a pen pressure detecting function. An electronic pen of this type has an opening portion on one side in an axial direction of a casing of the electronic pen to project a front end of a rod-shaped core body from the opening portion, and has a space that allows the core body to move in the axial direction in order to be able to transmit a pen pressure applied to the core body to a pen pressure detector disposed within the casing.

There has recently been an increasing outdoor usage of tablets or the like. However, as described above, the electronic pen is provided with the opening portion in the casing to project the front end of the core body to the outside, and in the case where the electronic pen has the pen pressure detecting function, the electronic pen has the space communicating with the opening portion in order to allow the core body to move in the axial direction. Therefore, water and dust or the like may enter the inside of the casing from the opening portion and the space, affect electric parts and connecting portions housed within the casing of the electronic pen, and consequently cause a failure in the electronic pen.

Therefore, there has recently been a desire for a waterproof property and a dustproof property of the electronic pen, and various proposals have been made in the past. For example, Japanese Patent Laid-Open No. 2010-198193 (hereinafter referred to as Patent Document 1) discloses a constitution in which, for example, a conically shaped rubber cap having a through hole formed in a top portion thereof so as to fit closely to a core body is put on so as to cover an opening portion of a casing of an electronic pen. In this constitution, the core body is attached through the through hole of the rubber cap and attached in a state in which a front end of the core body is projected.

According to this constitution, the opening portion of the casing is covered by the rubber cap and is thus not exposed to the outside, and no air gap is formed between the core body and the rubber cap due to close contact between the through hole and a side circumferential surface portion of the core body. Thus, a waterproof property and a dustproof property can be ensured.

However, in the case of Patent Document 1, the rubber cap is put onto the opening portion side of the electronic pen so as not to expose the opening portion of the casing of the electronic pen to the outside. Therefore, the rubber cap itself is exposed to the outside, and may fall off. In addition, the rubber cap in Patent Document 1 has the through hole in the top portion thereof. Thus, when the adhesion between the part of the through hole and the core body is degraded, the effect of the waterproof property and the dustproof property may be reduced. In particular, in the constitution of Patent Document 1, the part of contact between the through hole in the top portion and the core body is elastically displaced according to movement in the axial direction of the core body which movement is caused by the application of a pen pressure. Thus, the through hole in the top portion tends to be deformed due to a secular change, and the adhesion between the through hole in the top portion and the core body tends to become poor. The effect of the waterproof property and the dustproof property may therefore be reduced.

BRIEF SUMMARY

It is an object of the present disclosure to provide an electronic pen that can solve the problems described above and ensure a waterproof property and a dustproof property.

In order to solve the above problems, according to the present disclosure, there is provided an electronic pen including a tubular casing, a rod-shaped core body that projects outside of the casing through an opening of the casing, the opening being formed on one side in an axial direction of the casing, a pen pressure detector disposed within a hollow portion of the casing, wherein the pen pressure detector, in operation, detects a pen pressure applied to the core body, a core body insertion member disposed between the pen pressure detector and the opening of the casing within the hollow portion of the casing, the core body insertion member housing the core body movably in the axial direction of the casing and having a hollow space closed on a side of the pen pressure detector by a barrier that is elastically displaceable in the axial direction of the casing, and a first sealing member that separates the hollow space of the core body insertion member from the hollow portion of the casing. A pen pressure applied to the core body is transmitted to the pen pressure detector by elastic displacement of the barrier of the core body insertion member based on movement of the core body in the axial direction of the casing within the hollow space of the core body insertion member according to the pen pressure.

In the disclosure of the above-described constitution, the core body insertion member is disposed between the pen pressure detector and the opening portion of the casing within the hollow portion of the casing, and the core body insertion member houses the core body movably in the axial direction of the casing and has the hollow space closed on the pen pressure detector side (opposite side from an opening side for insertion of the core body) by the barrier configured to be elastically displaceable in the axial direction.

The hollow space of the core body insertion member and the space of the hollow portion of the casing are separated from each other by the first sealing member. That is, the hollow space of the core body insertion member is a space communicating with an external space of the electronic pen, but is closed by the barrier and is a space separate from the space of the hollow portion of the casing.

Hence, even in the constitution in which an opening portion of the hollow space of the core body insertion member (opening for insertion of the core body) into which the core body is inserted remains exposed to the outside, the hollow space of the core body insertion member can be isolated from the inside of the space of the hollow portion of the casing in which space electronic parts and electric connection parts are arranged. A waterproof property and a dustproof property can therefore be ensured.

In the electronic pen according to the present disclosure, the core body is configured to move freely in the axial direction according to an applied pen pressure within the hollow space of the core body insertion member which hollow space is closed by the barrier, and transmit the pen pressure to the pen pressure detector through elastic displacement of the barrier according to the movement in the axial direction of the core body according to the pen pressure. Hence, the electronic pen according to the present disclosure does not have a part such as the rubber cap in the case of Patent Document 1 described above, which part has the part of the through hole closely fitted to the core body and is elastically displaced according to movement in the axial direction of the core body. Therefore, the electronic pen according to the present disclosure can sufficiently resist secular changes, and ensure a waterproof property and a dustproof property.

According to the present disclosure, it is possible to provide an electronic pen that does not have a part including the part of a through hole closely fitted to a core body and elastically displaced according to movement in the axial direction of the core body, and can sufficiently resist secular changes and ensure a waterproof property and a dustproof property.

BRIEF DESCRIPTION OF THE DRAWINGS

FIGS. 5A, 5B, and 5C are diagrams of parts of an internal configuration of an electronic pen according to one or more embodiments of the present disclosure;

DETAILED DESCRIPTION

An electronic pen according to one or more embodiments of the present disclosure will hereinafter be described with reference to the drawings. The electronic pen is of a type that transmits an indicated position to a position detecting device by an electromagnetic induction system.

Figure 1:
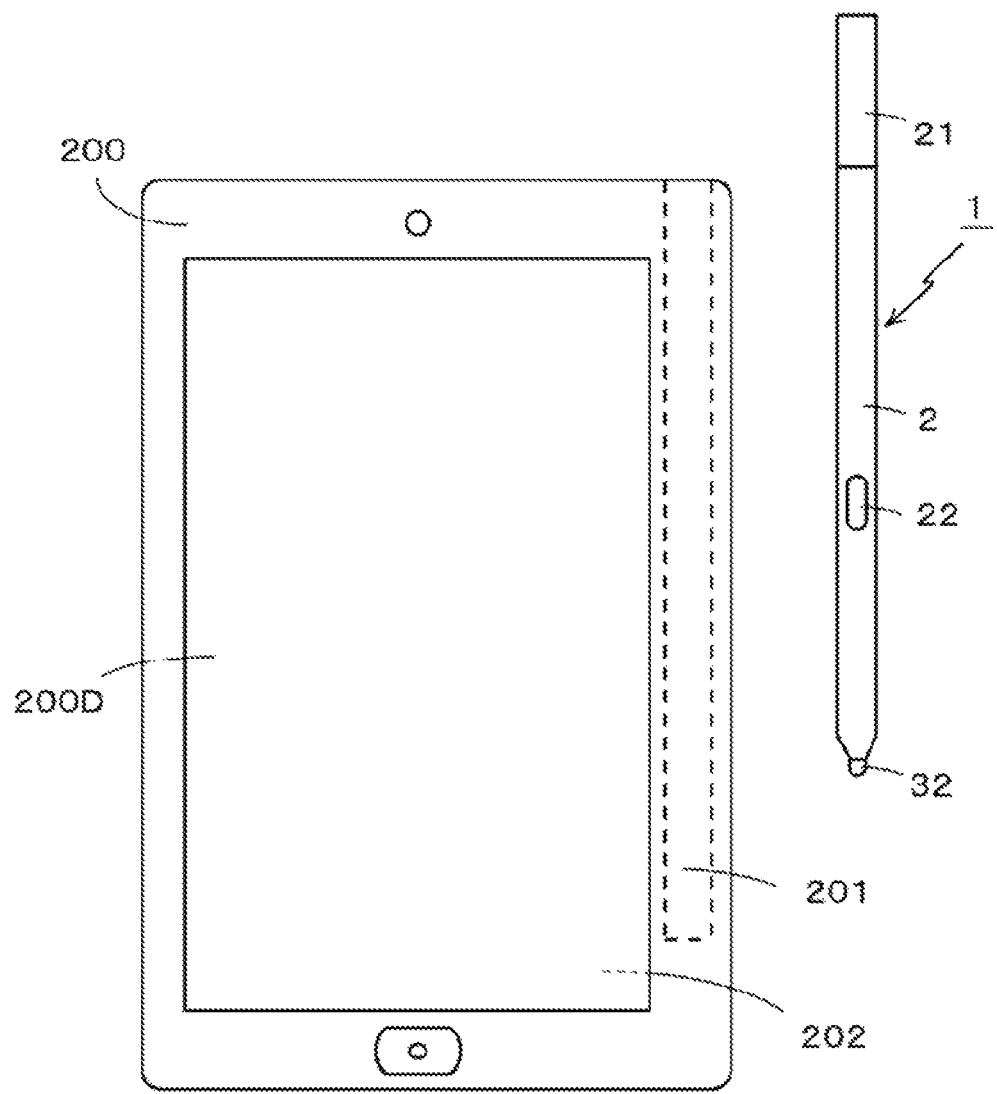
FIG. 1 is a diagram of an electronic apparatus and an electronic pen used therewith according to one or more embodiments of the present disclosure.

FIG. 1 shows an example of an electronic apparatus 200 that is used with an electronic pen 1 according to the present embodiment. In the present example, the electronic apparatus 200 is an advanced mobile telephone terminal having a display screen 200D of a display device such as, for example, a liquid crystal display (LCD) or the like. The electronic apparatus 200 includes a position detecting device 202 of an electromagnetic induction type under (on the back side of) the display screen 200D.

The casing of the electronic apparatus 200 in the present example has a housing recessed hole 201 in which the electronic pen 1 can be housed. As required, a user extracts the electronic pen 1 housed in the housing recessed hole 201 from the electronic apparatus 200, and performs a position indicating operation with the display screen 200D as an input surface.

In the electronic apparatus 200, when a position indicating operation is performed on the display screen 200D by the electronic pen 1, the position detecting device 202 disposed on the back side of the display screen 200D detects a position indicated by the electronic pen 1 and a pen pressure, and a microcomputer included in the position detecting device 202 of the electronic apparatus 200 performs display processing according to the position indicated on the display screen 200D and the pen pressure.

In the electronic pen 1 according to the present embodiment, a plurality of parts of the electronic pen 1 are arranged in an axial direction and housed within a hollow portion of a tubular case (casing) 2 formed of a resin, for example. One side of the tubular case 2 has a tapered shape, and an end on the one side of the tubular case 2 has an opening (not shown in FIG. 1). A tip end portion 32 of a rod-shaped core body 3 to be described later is exposed as a pen tip through the opening. A side of the case 2 that is opposite to the pen tip side is fitted with a case cap 21, and is thereby closed in a state in which sealing that takes a waterproof property and a dustproof property into account is ensured.

The electronic pen 1 in the present example has a side switch. Specifically, a printed circuit board is provided in the hollow portion within the case 2, as will be described later, and a side switch is mounted on the printed circuit board. A through hole (not shown in FIG. 2) is bored in a side circumferential surface of the case 2 of the electronic pen 1, which position corresponds to the side switch. A depression operating element 22 for the side switch is exposed in the part by the through hole so as to enable depression of the side switch mounted on the printed circuit board through the through hole. In this case, assignment and setting of a predetermined function to an operation of depressing the side switch by the depression operating element 22 are made on the electronic apparatus 200 side including the position detecting device 202. For example, in the electronic apparatus 200 in the present example, the operation of depressing the side switch by the depression operating element 22 can be assigned and set as an operation similar to a clicking operation of a pointing device such as a mouse or the like.

Figure 2:
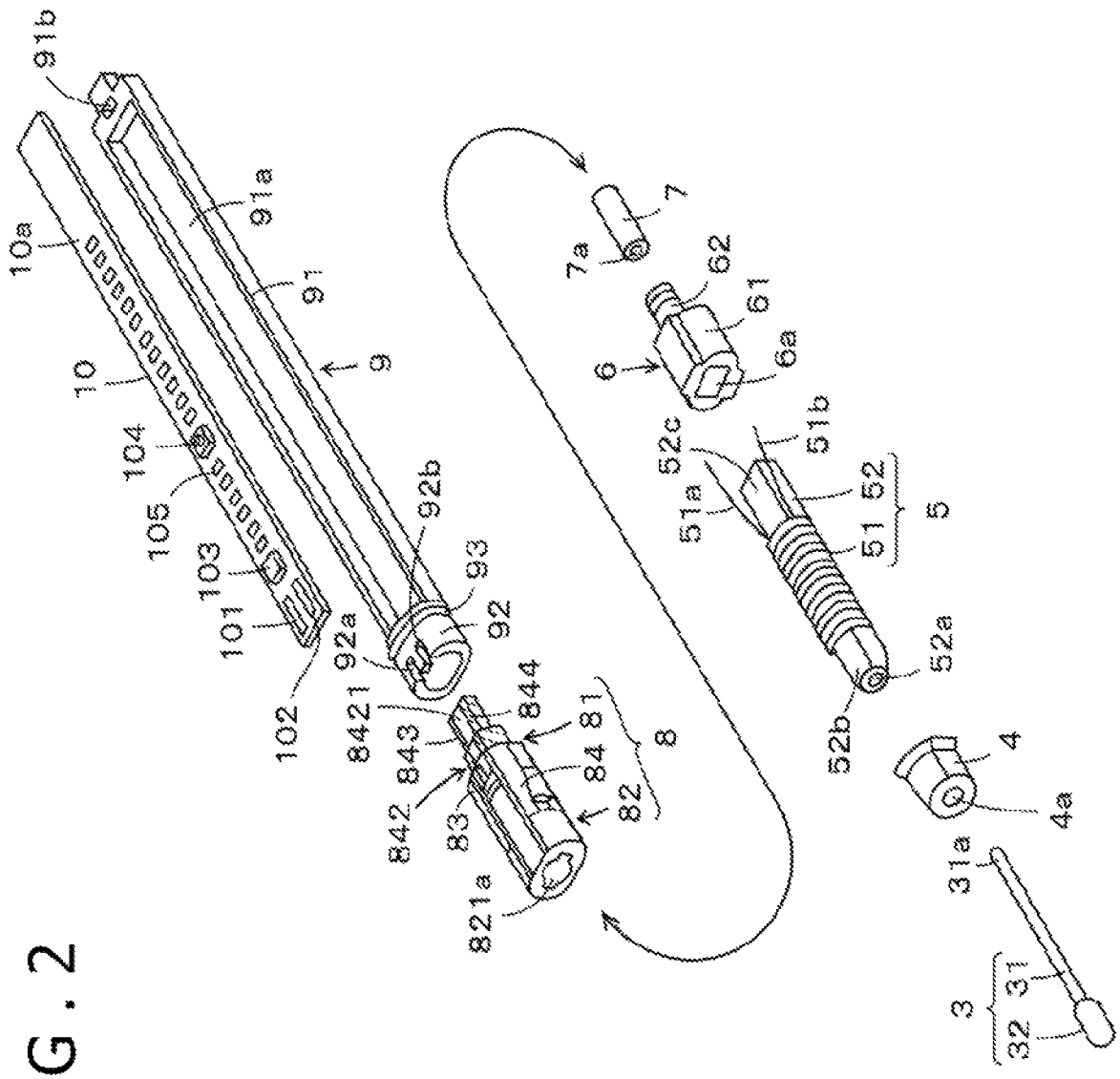
FIG. 2 is an exploded perspective view of an internal configuration of an electronic pen according to one or more embodiments of the present disclosure.

FIG. 2 is an exploded perspective view of parts housed within the case 2 of the electronic pen 1, which are arranged separated from each other. In the present embodiment, an external shape in a direction orthogonal to the central axis of the case 2 (which external shape is equal to the contour shape of a cross section of the case 2) is a flat shape. The cross-sectional shape of the hollow portion within the case 2 also has a flat shape corresponding to the external shape of the case 2, and parts housed within the case 2 also have a shape corresponding to the flat shape of the hollow portion.

As shown in FIG. 2, arranged within the hollow portion of the case 2 in the axial direction of the case 2 in order from the pen tip side are a cap member 4 constituting a first sealing member, a coil member 5, a coil member holder 6, a pressing member 7, a pen pressure detector 8, and a board holder 9. A printed circuit board 10 is housed in and locked to a board housing portion 91 of the board holder 9. The printed circuit board 10 is an example of a circuit board.

A core body 3 is constituted of a core body main body portion 31 and a tip end portion 32 as a pen tip. The core body 3 is attached by inserting the core body main body portion 31 from the opening on the pen tip side of the case 2 and engaging the core body main body portion 31 with the pressing member 7 disposed in the pen pressure detector 8, as will be described later, in a state in which all of the above-described parts are housed within the hollow portion of the case 2. The core body 3 is formed of a resin as an example of a hard nonconductive material, for example polycarbonate, synthetic resin, acrylonitrile-butadiene-styrene (ABS) resin, or the like, so as to be able to transmit a pressure (pen pressure) applied to the tip end portion 32 to a pressure sensor 83 of a pen pressure detector 81. The core body 3 can be inserted into and detached from the electronic pen 1.

The coil member 5 is constituted of a coil 51 and a magnetic core around which the coil 51 is wound, which magnetic core is a ferrite core 52 in the present example. The ferrite core 52 of the coil member 5 in the present example has a columnar shape having a through hole 52a at a position of the central axis, the through hole 52a having a diameter slightly larger than the diameter of the core body main body portion 31 so that the core body main body portion 31 of the rod-shaped core body 3 can be inserted through the through hole 52a. The ferrite core 52 in the present embodiment has a flat cross-sectional shape corresponding to the cross-sectional shape of the hollow portion of the case 2. A tapered portion 52b that tapers off is formed on the pen tip side of the ferrite core 52. Incidentally, the tip end portion 32 of the core body 3 in the present example is formed so as to have a diameter slightly larger than the diameter of the core body main body portion 31.

The cap member 4 is provided on the tapered portion 52b side of the ferrite core 52, the tapered portion 52b side being on the pen tip side of the electronic pen. The cap member 4 is formed of a material having elasticity, for example, an elastic rubber. The cap member 4 has such a cap shape as to cover the pen tip side of the ferrite core 52, and has an opening (through hole) 4a for insertion of the core body main body portion 31 of the core body 3. The diameter of the opening 4a in the present example is formed so as to be larger than the diameter of the through hole 52a of the ferrite core 52. The external appearance of the cap member 4 in the present example has a flared skirt shape, as shown in the figure.

The coil member holder 6 is provided on a side of the ferrite core 52 that is opposite to the tapered portion 52b on the pen tip side of the electronic pen. The coil member holder 6 is formed of a material having elasticity, for example, an elastic rubber. An end of the ferrite core 52 that is opposite to the tapered portion 52b on the pen tip side of the electronic pen is a coil non-wound portion 52c on which the coil 51 is not wound. The coil member holder 6 has a fitting portion 61 that is fitted with and houses the coil non-wound portion 52c of the ferrite core 52, and has a projecting portion 62 press-fitted into a hollow portion 821a of a pen pressure transmission member 82, which will be described later, of the pen pressure detector 8.

The fitting portion 61 of the coil member holder 6 is provided with a recessed hole 61a corresponding to the external shape of the coil non-wound portion 52c. A through hole 62a (see FIGS. 5A and 5B to be described later) through which the core body main body portion 31 of the core body 3 is inserted is formed in the projecting portion 62. The through hole 62a of the projecting portion 62 communicates with the recessed hole 61a of the fitting portion 61. Hence, a hollow space through which the core body main body portion 31 of the core body 3 is inserted is formed through the fitting portion 61 and the projecting portion 62 in the coil member holder 6.

Because the through hole 52a through which the core body main body portion 31 of the core body 3 is inserted is formed in the ferrite core 52, a hollow space through which the core body main body portion 31 of the core body 3 is inserted is formed through the coil member 5 and the coil member holder 6 in a state in which the coil non-wound portion 52c of the ferrite core 52 of the coil member 5 is fitted in the fitting portion 61 of the coil member holder 6.

The pressing member 7 disposed on the projecting portion 62 side of the coil member holder 6 has a fitting recessed hole 7a (see FIG. 5A to be described later) into which an end portion 31a of the core body main body portion 31 of the core body 3 is press-fitted. The outside diameter of the pressing member 7 is selected to be larger than the through hole 62a of the projecting portion 62 of the coil member holder 6. Hence, the core body 3 does not fall off due to the presence of the pressing member 7 when the end portion 31a of the core body main body portion 31 of the core body 3 is fitted in the pressing member 7 in a state in which the core body main body portion 31 of the core body 3 is inserted through the through hole 52a of the ferrite core 52 of the coil member 5, the recessed hole 61a of the fitting portion 61 of the coil member holder 6, and the through hole 62a of the projecting portion 62, and in which state the end portion 31a of the core body main body portion 31 of the core body 3 is projected to the pressing member 7 side. However, when the core body 3 is strongly pulled to the tip end portion 32 side, the fit between the end portion 31a of the core body main body portion 31 and the fitting recessed hole 7a of the pressing member 7 is released, so that the core body 3 can be extracted. Thus, the core body 3 is replaceable.

The pen pressure detection module 8 in the present embodiment is formed by engaging and coupling the pen pressure detector 81 and the pen pressure transmission member 82 with each other.

The pen pressure detector 81 in the present embodiment includes a pressure sensor 83 constituted of a plurality of pressure sensing parts, and a holder 84 that retains the pressure sensor 83 and has a function of making electric connections. The holder 84 is formed of an insulative material, for example, a resin. The holder 84 integrally includes a retaining portion 841 that retains the pressure sensor 83, and a connecting portion 842 for electrically connecting two electrodes of the pressure sensor 83 retained by the retaining portion 841 to the printed circuit board 10 housed in the board holder 9.

The pen pressure transmission member 82 makes the plurality of pressure sensing parts of the pressure sensor 83 retained by the retaining portion 841 of the holder 84 of the pen pressure detector 81 by engaging with the retaining portion 841 of the holder 84. In addition, as described earlier, the pen pressure transmission member 82 has the hollow portion 821a into which the projecting portion 62 of the coil member holder 6 is press-fitted. The projecting portion 62 of the coil member holder 6 is press-fitted into the hollow portion 821a of the pen pressure transmission member 82 engaged and coupled with the pen pressure detector 81. The pen pressure detection module 8 is thereby coupled with the coil member 5.

Figure 3:
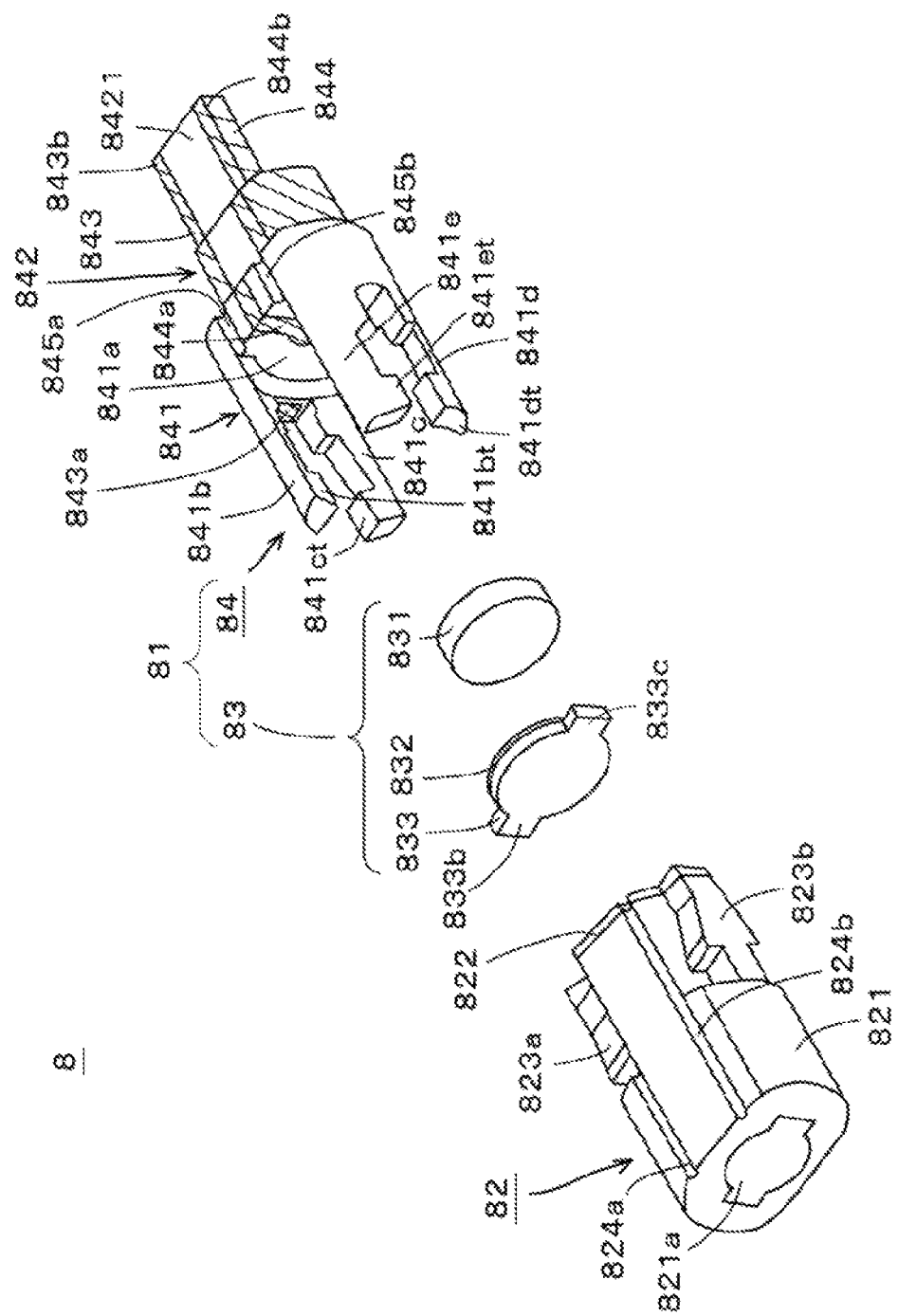
FIG. 3 is an exploded perspective view of a pen pressure detector of an electronic pen according to one or more embodiments of the present disclosure.
Figure 4A:
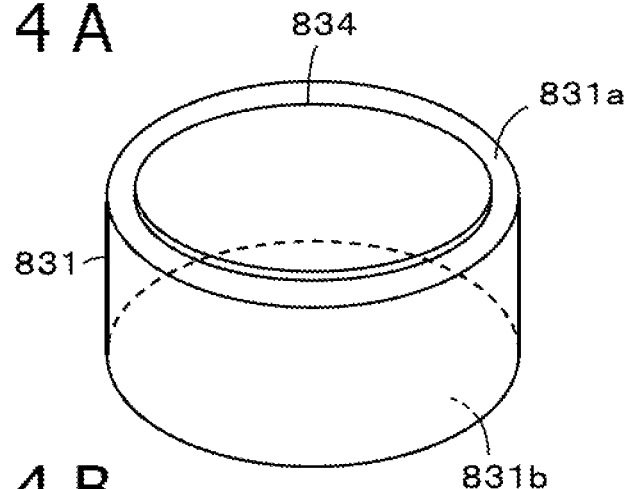
FIGS. 4A, 4B, and 4C are diagrams of parts of a pressure sensor used in a pen pressure detector in an electronic pen according to one or more embodiments of the present disclosure.
Figure 4B:
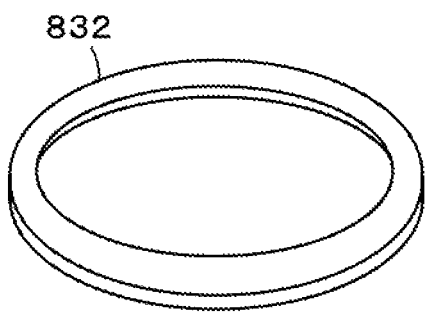
Figure 4C:
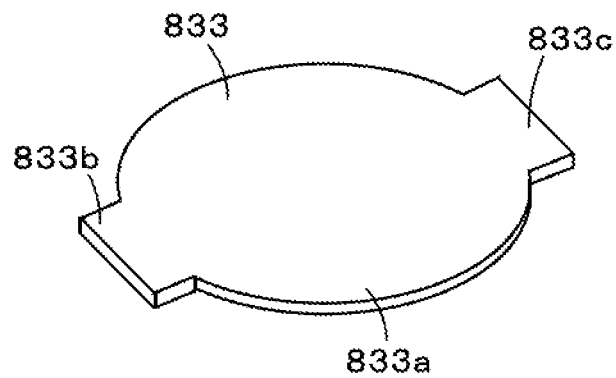

FIG. 3 is an exploded perspective view of assistance in explaining an example constitution of the pen pressure detection module 8 in more detail. FIGS. 4A, 4B, and 4C are diagrams of assistance in explaining a group of pressure sensing parts constituting the pressure sensor 83. FIG. 5A is a sectional view of the pen pressure detection module 8 in a state of being housed within the case 2 and vicinities of the pen pressure detection module 8. FIG. 5B is an external perspective view of the coil member holder 6 as viewed from the projecting portion 62 side of the coil member holder 6. FIG. 5C is an external perspective view of the pen pressure transmission member 82 as viewed from the side of a coupling portion of the pen pressure transmission member 82 which coupling portion is coupled to the pen pressure detector 81.

As shown in FIG. 3 and FIGS. 4A to 4C, the pressure sensor 83 of the pen pressure detector 81 in the present embodiment includes a dielectric 831, a spacer 832, and a conductive elastic body 833.

As shown in FIG. 4A, the dielectric 831, for example, has substantially the shape of a disk. The dielectric 831 has one circular surface 831a and another circular surface 831b that face each other. A circular conductor layer 834 is formed on the one surface 831a of the dielectric 831. The conductor layer 834 constitutes a first electrode of a variable capacitance capacitor as the pressure sensor 83 in the present example.

The spacer 832 is formed of an insulative material. As shown in FIG. 4B, the spacer 832 is a thin plate-shaped body having a ring shape whose outside diameter is equal to the diameter of the dielectric 831.

The conductive elastic body 833 in the present example is formed of an elastic rubber having conductivity. As shown in FIG. 4C, the conductive elastic body 833 in the present example has a shape obtained by forming two projecting portions 833b and 833c from peripheral edges of a thin plate-shaped body 833a having the shape of a disk whose outside diameter is equal to the diameter of the dielectric 831, the peripheral edges of the plate-shaped body 833a being separated from each other at an interval of 180 degrees. The spacer 832 is, for example, bonded to the discoid plate-shaped body 833a of the conductive elastic body 833.

Then, the variable capacitance capacitor as the pressure sensor 83 in the present example is formed by superposing the conductive elastic body 833 onto the other surface 831b side of the dielectric 831 with the spacer 832 interposed therebetween. The variable capacitance capacitor as the pressure sensor 83 in the present example includes the first electrode constituted by the conductor layer 834 formed on the one surface 831a of the dielectric 831 and a second electrode constituted by the conductive elastic body 833.

The holder 84 of the pen pressure detector 81 is configured, for example, as an injection molded product produced by using resin, to integrally include the retaining portion 841 and the connecting portion 842. The connecting portion 842 of the holder 84 of the pen pressure detector 81 includes a plate-shaped projecting portion 8421 that projects in the axial direction (same direction as a direction of application of a pen pressure) parallel with a board surface 10a of the printed circuit board 10. The projecting portion 8421 has a flat surface parallel to the board surface 10a of the printed circuit board 10. The flat surface of the projecting portion 8421 is provided so as to come into contact with the board surface 10a precisely when the pen pressure detection module 8 is fitted into the board holder 9 and engaged with the printed circuit board 10.

In the present embodiment, two terminal members 843 and 844 (hatched in FIG. 2 and FIG. 3 to facilitate understanding) are formed on the holder 84 as conductive three-dimensional fine patterns from the retaining portion 841 to the connecting portion 842 along the direction of application of a pen pressure, that is, the axial direction of the electronic pen 1. As a result, the terminal members 843 and 844 are integrally formed on the holder 84.

Here, microscopic integrated processing technology (MIPTEC) developed by Panasonic Corporation, for example, can be used as a method of forming the two terminal members 843 and 844 as three-dimensional fine patterns on the surface of the holder 84. In order to facilitate electric connection by contact, nickel plating layers are formed on the surfaces of the terminal members 843 and 844 formed as three-dimensional fine patterns, and further gold plating layers are formed on the nickel plating layers.

As shown in FIG. 2 and FIG. 3, the two terminal members 843 and 844 are formed at two end edges of the projecting portion 8421, the end edges being arranged in a direction orthogonal to the direction of application of a pen pressure, and are formed along long sides in the direction of application of a pen pressure in a state of being separated from each other. The two terminal members 843 and 844 are formed so as to be exposed at least at the two end edges of the projecting portion 8421.

The retaining portion 841 of the holder 84 of the pen pressure detector 81 includes a recessed portion 841a housing the pressure sensor 83 in which the dielectric 831, the spacer 832, and the conductive elastic body 833 are coupled to each other, and includes engaging projecting portions 841b, 841c, 841d, and 841e projecting in the axial direction from the recessed portion 841a to the pen pressure transmission member 82 side (core body 3 side). One end portion 844a of the terminal member 844 is formed in an exposed state on a bottom portion of the recessed portion 841a (see a hatched portion in FIG. 3). The dielectric 831 is housed such that the conductor layer 834 formed on the one surface 831a abuts against the one end portion 844a of the terminal member 844 on the bottom portion of the recessed portion 841a. Hence, in a state in which the dielectric 831 is housed and retained within the recessed portion 841a, the conductor layer 834 as the first electrode of the pressure sensor 83 and the one end portion 844a of the terminal member 844 are in contact with each other and electrically connected to each other.

In addition, end surfaces against which the projecting portions 833b and 833c of the conductive elastic body 833 abut are formed between the engaging projecting portions 841b and 841c of the retaining portion 841 of the holder 84 of the pen pressure detector 81 and between the engaging projecting portions 841d and 841e of the retaining portion

841. In the present embodiment, one end portion 843*a* of the terminal member 843 is formed in an exposed state on the end surface between the engaging projecting portions 841*b* and 841*c* (see a hatched portion in FIG. 3). Hence, in a state in which the conductive elastic body 833 is housed and retained within the recessed portion 841*a* of the holder 84 together with the dielectric 831 and the spacer 832, the projecting portion 833*b* of the conductive elastic body 833 abuts against the one end portion 843*a* of the terminal member 843. The conductive elastic body 833 and the terminal member 843 are thereby in contact with each other and electrically connected to each other.

Thus, in the present embodiment, when the pressure sensor 83 is housed and retained in the retaining portion 841 of the holder 84 of the pen pressure detector 81, the first electrode and the second electrode of the pressure sensor 83 are automatically electrically connected to the two terminal members 843 and 844 of the connecting portion 842.

In the present embodiment, the two terminal members 843 and 844 of the connecting portion 842 of the holder 84 of the pen pressure detector 81 are configured to be electrically connected to conductive patterns formed on the printed circuit board 10 housed in the board holder 9.

The board holder 9 is formed of an insulative material, for example, a resin. The board holder 9 includes a board housing portion 91 and a fitting portion 92 fitted with the holder 84 of the pen pressure detector 81 of the pen pressure detector 8.

The board housing portion 91 of the board holder 9 is formed in the shape of a box without a lid. The printed circuit board 10 is housed within a recessed portion 91*a* of the board housing portion 91 with the direction of long sides of the elongate rectangular-shaped printed circuit board 10 set in the axial direction of the electronic pen 1. In the present example, the depth of the recessed portion 91*a* of the board housing portion 91 is substantially equal to the thickness of the printed circuit board 10.

In addition, the fitting portion 92 of the board holder 9 in the present embodiment has a tubular shape having a hollow portion into which the connecting portion 842 of the holder 84 of the pen pressure detector 81 of the pen pressure detection module 8 is inserted. The printed circuit board 10 has conductor patterns 101 and 102 formed thereon, the conductor patterns 101 and 102 being positioned and formed so as to be electrically connected to the two terminal members 843 and 844 of the connecting portion 842 of the holder 84 of the pen pressure detector 81, the terminal members 843 and 844 being connected to the two electrodes of the pressure sensor 83 (see FIG. 2).

Then, when the connecting portion 842 of the holder 84 of the pen pressure detection module 8 is inserted into the fitting portion 92 of the board holder 9, as shown in FIG. 5A, the connecting portion 842 engages with the upper surface (board surface) 10*a* of the printed circuit board 10 housed in the board housing portion 91 of the board holder 9 so as to be in contact with the upper surface (board surface) 10*a*. The two electrodes of the pressure sensor 83 retained by the pen pressure detector 81 are thereby electrically connected to the conductor patterns 101 and 102 formed on the board surface 10*a* of the printed circuit board 10 through the two terminal members 843 and 844 of the connecting portion 842. The two terminal members 843 and 844 of the connecting portion 842 of the holder 84 of the pen pressure detector 81 of the pen pressure detection module 8 are in contact with and electrically connected to the conductor patterns 101 and 102 on the printed circuit board 10 by the fitting and coupling of the pen pressure detector 81 of the pen pressure detection module 8 to the board holder 9 and the printed circuit board 10. In the present embodiment, however, the two terminal members 843 and 844 are soldered to the conductor patterns 101 and 102 to make the electric connections more secure.

Incidentally, the case cap 21 renders the board holder 9 non-movable in the direction of application of a pen pressure applied to the core body 3. Therefore, when the pen pressure detection module 8 is fitted to the board holder 9, the pen pressure detection module 8 is prevented from being moved in the axial direction within the case 2 of the electronic pen 1. Hence, the pen pressure detector 81 can surely detect a pen pressure applied to the core body.

Figure 6:
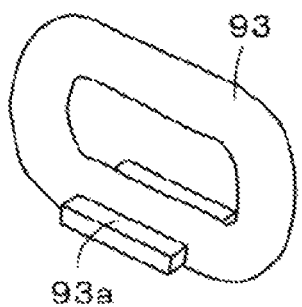
FIG. 6 is a diagram of part of an internal configuration of an electronic pen according to one or more embodiments of the present disclosure.

In the present embodiment, as shown in FIG. 5A, the fitting portion 92 of the board holder 9 is provided with a sealing member 93 that closes a gap between the fitting portion 92 of the board holder 9 and an inner wall of the hollow portion of the case 2 when the sealing member 93 is housed within the case 2. FIG. 6 shows an external appearance of the sealing member 93, which is formed by an elastic body, for example, a ring-shaped member made of rubber. As shown in FIG. 5A, a ring-shaped recessed groove 92*a* is formed in a circumferential side portion of the fitting portion 92 of the board holder 9. The sealing member 93 is fixed and housed within the ring-shaped recessed groove 92*a*. Incidentally, in the present embodiment, projections 93*a* are formed on the sealing member 93 so as to prevent the sealing member 93 from rotating in the circumferential direction of the fitting portion 92, and notches 92*b* (see FIG. 5A) that house the projections 93*a* of the sealing member 93 are formed in a part of the ring-shaped recessed groove of the fitting portion 92.

The sealing member 93 separates a space in which the printed circuit board 10 is disposed in the hollow portion within the case 2 from a space on an opening portion 2*a* side in which space the pen pressure detection module 8 is present and from which space the core body 3 is projected. Hence, the sealing member 93 corresponds to a second sealing member.

The electronic pen 1 according to the present embodiment uses a resonance circuit constituted of the coil 51 wound around the ferrite core 52 of the coil member 5 and a capacitor in order to transmit a position indicated by the electronic pen 1 to the position detecting device. The capacitor 103 constituting the resonance circuit is formed on the board surface 10*a* of the printed circuit board 10, as shown in FIG. 2. In addition, a side switch 104 formed by a depression switch that is turned on and off by being depressed is provided on the board surface 10*a* of the printed circuit board 10. Further, a capacitor 105 connected in series with the side switch 104 and other electronic parts are arranged on the board surface 10*a* of the printed circuit board 10.

Incidentally, a series circuit of the side switch 104 and the capacitor 105 is connected in parallel with the resonance circuit formed by the coil 51 and the capacitor 103, and changes the resonance frequency of the resonance circuit according to the turning on or off of the side switch 104, thereby notifying the position detecting device 202 whether the side switch 104 is turned on or remains off.

As described earlier, the pen pressure detector 81 of the pen pressure detection module 8 according to the present embodiment uses, as the pressure sensor 83, the variable capacitance capacitor that exhibits a capacitance corresponding to a pen pressure. The electronic pen 1 makes the resonance frequency of the resonance circuit correspond to the pen pressure because the variable capacitance capacitor of the pressure sensor 83 of the pen pressure detector 81 of the pen pressure detection module 8 is connected to the resonance circuit.

The position detecting device 202 compatible with the electronic pen 1 has a function of detecting a pen pressure applied to the pen tip of the electronic pen 1 by detecting a change in the resonance frequency of an electromagnetic coupling signal from the electronic pen 1. The conductor patterns 101 and 102 described above constitute terminal portions for connecting the variable capacitance capacitor formed by the pressure sensor 83 of the pen pressure detector 81 of the pen pressure detection module 8 to the resonance circuit.

As shown in FIGS. 5A and 5C, the pen pressure transmission member 82 of the pen pressure detection module 8 is constructed by integrally forming a tubular body portion 821 having the hollow portion 821a therewithin and a barrier 822 that closes the hollow space of the hollow portion 821a of the tubular body portion 821.

The barrier 822 in the present example is formed by a thin plate-shaped body. As shown in FIGS. 5A and 5C, recessed portions 822a and 822b are formed in the thin plate-shaped body. Thus, because of thin-walled portions formed by reduced thickness of the parts of the recessed portions 822a and 822b, the barrier 822 is elastically displaced in a direction of the plate thickness. In the present embodiment, the barrier 822 is formed by an elastic member, for example, an elastomer, which, coupled with the thin-walled portions of the parts of the recessed portions 822a and 822b, facilitates the elastic displacement of the barrier 822 in the direction of the plate thickness.

The tubular body portion 821 may be formed by a material not having elasticity, for example, a resin, or may be formed by an elastomer, as in the case of the barrier 822. In a case where the tubular body portion 821 is formed of a material not having elasticity and the barrier 822 is formed of an elastomer having elasticity, the pen pressure transmission member 82 may be manufactured by a method of two-color molding.

An opening portion is formed on a side of the hollow portion 821a of the tubular body portion 821 on which side the barrier 822 is not provided. The projecting portion 62 of the coil member holder 6 is press-fitted from the opening portion side into the hollow portion 821a. In the present example, the side circumferential surface of the projecting portion 62 of the coil member holder 6 is provided with two ring-shaped projecting portions 621 and 622 as shown in FIGS. 5A and 5B. The coil member holder 6 is fitted into the pen pressure transmission member 82 without a gap being formed between the inner wall of the pen pressure transmission member 82 and the projecting portion 62 of the coil member holder 6 due to the ring-shaped projecting portions 621 and 622. Incidentally, while the two ring-shaped projecting portions 621 and 622 are formed on the projecting portion 62 in the present example, one ring-shaped projecting portion may suffice.

Prior to the press-fitting of the coil member holder 6, the pressing member 7 is housed within the hollow portion 821a of the pen pressure transmission member 82 such that the fitting recessed hole 7a is oriented toward the opening side of the tubular body portion 821 and a side of the pressing member 7 that is opposite to the fitting recessed hole 7a abuts against the barrier 822 of the pen pressure transmission member 82. The outside diameter of the pressing member 7 is larger than the through hole 62a of the projecting portion 62 of the coil member holder 6. Thus, when the coil member holder 6 is press-fitted into the hollow portion 821a of the pen pressure transmission member 82, the pressing member 7 is housed within the hollow portion 821a of the pen pressure transmission member 82 without falling off the hollow portion 821a.

Then, when the core body main body portion 31 of the core body 3 is inserted through the through hole 52a of the ferrite core 52 of the coil member 5, the recessed hole 61a of the fitting portion 61 of the coil member holder 6, and the through hole 62a of the projecting portion 62, and pushed in, the end portion 31a of the core body main body portion 31 of the core body 3 is press-fitted into the fitting recessed hole 7a of the pressing member 7 in the hollow portion 821a of the pen pressure transmission member 82, as shown in FIG. 5A.

Hence, when a pen pressure is applied to the core body 3, the pen pressure is transmitted to the pressing member 7, the pressing member 7 presses the barrier 822 of the pen pressure transmission member 82, and the barrier 822 is elastically displaced in the axial direction according to the applied pen pressure.

As described above, when the coil member 5 is fitted to the pen pressure transmission member 82 via the coil member holder 6, the through hole 52a of the ferrite core 52 of the coil member 5, the recessed hole 61a of the fitting portion 61 of the coil member holder 6, and the through hole 62a of the projecting portion 62 communicate with each other to form a hollow space through which to insert the core body main body portion 31 of the core body 3. This hollow space is closed by the barrier 822 of the pen pressure transmission member 82. That is, in the present example, a core body insertion member is formed by fitting and coupling the coil member 5, the coil member holder 6, and the pen pressure transmission member 82 with each other.

The tubular body portion 821 of the pen pressure transmission member 82 also has an engaging projection 823a and an engaging projection 823b formed thereon, the engaging projection 823a being engaged with the engaging projecting portion 841b and the engaging projecting portion 841c of the retaining portion 841 of the holder 84 of the pen pressure detector 81, and the engaging projection 823b being engaged with the engaging projecting portion 841d and the engaging projecting portion 841e. An engaging pawl portion 841bt and an engaging pawl portion 841ct to be engaged with the engaging projection 823a are formed at ends of the engaging projecting portion 841b and the engaging projecting portion 841c of the retaining portion 841 of the holder 84. In addition, an engaging pawl portion 841dt and an engaging pawl portion 841et to be engaged with the engaging projection 823b are formed at ends of the engaging projecting portion 841d and the engaging projecting portion 841e.

Then, when the pen pressure transmission member 82 is coupled to the holder 84 in the axial direction in a state in which the pressure sensor 83 is housed in the retaining portion 841 of the holder 84, the pen pressure transmission member 82 and the holder 84 are coupled to each other, and thereby the pressure sensor 83 is retained by the retaining portion 841 of the holder 84, as shown in FIG. 2. At this time, the engaging pawl portion 841bt and the engaging pawl portion 841ct at the ends of the engaging projecting portion 841b and the engaging projecting portion 841c of the retaining portion 841 of the holder 84 are engaged with the engaging projection 823a of the pen pressure transmission member 82, and the engaging pawl portion 841dt and the engaging pawl portion 841et at the ends of the engaging projecting portion 841d and the engaging projecting portion 841e are engaged with the engaging projection 823b. The pen pressure transmission member 82 is thus engaged with the retaining portion 841 of the holder 84. Thereby, the pen pressure transmission member 82 is locked to the holder 84, and the pen pressure transmission member 82 and the holder 84 are coupled to each other.

In the state in which the pen pressure transmission member 82 is thus engaged with and coupled to the holder 84, as shown in FIG. 3, in the retaining portion 841 of the holder 84 of the pen pressure detector 81, as described earlier, the conductor layer 834 (first electrode) on the one end surface of the dielectric 831 of the pressure sensor 83 is electrically connected to the one end portion 844a of the terminal member 844, and the projecting portion 833b of the conductive elastic body 833 (second electrode) is electrically connected to the one end portion 843a of the terminal member 843.

In the state in which the pen pressure transmission member 82 is engaged with and coupled to the holder 84, as shown in FIG. 5A, the barrier 822 of the pen pressure transmission member 82 can press the conductive elastic body 833 of the pressure sensor 83. Incidentally, in the present embodiment, as shown in FIG. 5C, an end 823at of the engaging projection 823a of the pen pressure transmission member 82 which end is on the barrier 822 side and an end 823bt of the engaging projection 823b which end is on the barrier 822 side are formed obliquely so as to project slightly from the surface of the barrier 822 in the axial direction. Therefore, because of the presence of the end 823at of the engaging projection 823a of the pen pressure transmission member 82 which end is on the barrier 822 side and the end 823bt of the engaging projection 823b which end is on the barrier 822 side, when no pen pressure is applied, the barrier 822 faces the conductive elastic body 833 of the pressure sensor 83 with a small space interposed therebetween, as shown in FIG. 5A.

Then, as described above, when a pen pressure is applied to the core body 3, the barrier 822 of the pen pressure transmission member 82 is pressed by the pressing member 7 according to the applied pen pressure, and the barrier 822 is elastically displaced in the axial direction according to the applied pen pressure. The conductive elastic body 833 of the pressure sensor 83 is pressed by the elastic displacement of the barrier 822. Therefore, the conductive elastic body 833 and the dielectric 831 separated from each other via the spacer 832 come into contact with each other, and the area of the contact changes according to the pen pressure. A capacitance corresponding to the area of the contact between the conductive elastic body 833 and the dielectric 831 is obtained between the first electrode and the second electrode of the pressure sensor 83. That is, the pen pressure can be detected from the capacitance of the variable capacitance capacitor as the pressure sensor 83.

As described above, the coil member 5 is fitted and coupled to the pen pressure transmission member 82 of the pen pressure detection module 8 via the coil member holder 6, and then the connecting portion 842 of the holder 84 of the pen pressure detector 81 of the pen pressure detection 8 is coupled to the printed circuit board 10 via the fitting portion 92 of the board holder 9. Thus, the coil member 5 constituted of the ferrite core 52 wound with the coil 51, the pen pressure detection module 8, and the board holder 9 retaining the printed circuit board 10 are coupled to each other to form one module (pen module part).

Figure 7:
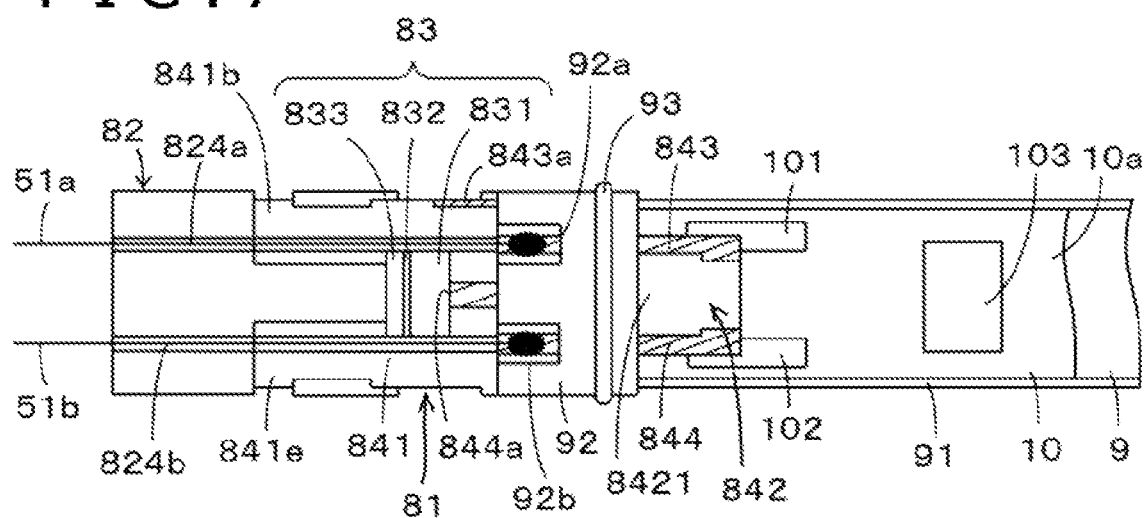
FIG. 7 is a diagram of parts of an internal configuration of an electronic pen according to the present disclosure.

After the pen pressure detection module 8 and the board holder 9 housing the printed circuit board 10 are fitted and coupled to each other, as shown in FIG. 7, one end portion 51a and another end portion 51b of the coil 51 of the coil member 5 are, for example, soldered and connected to the terminal member 843 and the terminal member 844 at parts of the connecting portion 842 of the holder 84 of the pen pressure detector 81 which parts are fitted in the fitting portion 92 of the board holder 9. Parts filled in black in FIG. 7 represent the soldered parts.

In the present embodiment, as shown in FIG. 2 and FIG. 7, a notch 92a and a notch 92b are formed in the fitting portion 92 of the board holder 9 so that the parts of connection (soldered parts) of the one end portion 51a and the other end portion 51b of the coil 51 to the terminal member 843 and the terminal member 844 do not obstruct the fitting of the fitting portion 92 of the board holder 9 with the pen pressure detector 8.

In addition, in the present embodiment, a recessed groove 824a and a recessed groove 824b in the axial direction are formed in the pen pressure transmission member 82 of the pen pressure detector 8, and a recessed groove 845a and a recessed groove 845b in the axial direction which recessed grooves are in line with the recessed groove 824a and the recessed groove 824b of the pen pressure transmission member 82 are also formed in the peripheral side surface of the holder 84 of the pen pressure detector 81. As shown in FIG. 7, the one end portion 51a and the other end portion 51b of the coil 51 of the coil member 5 pass through the insides of the recessed groove 824a and the recessed groove 824b and the recessed groove 845a and the recessed groove 845b, and are soldered and connected to the terminal member 843 and the terminal member 844 of the connecting portion 842 of the holder 84 of the pen pressure detector 81.

The one end portion 51a and the other end portion 51b of the coil 51 of the coil member 5 are thus prevented from protruding in a direction orthogonal to the axial direction in the pen module part. Further, in the present example, as shown in FIG. 5B, a stepped portion 61b and a stepped portion 61c for preventing the one end portion 51a and the other end portion 51b of the coil from protruding from the pen module part are formed in the outer peripheral portion of the fitting portion 61 of the coil member holder 6.

Incidentally, instead of simply soldering the one end portion 51a and the other end portion 51b of the coil 51 to the terminal member 843 and the terminal member 844, V-shaped metal terminals or the like may be formed at the positions of the terminal member 843 and the terminal member 844 in advance, and the one end portion 51a and the other end portion 51b of the coil 51 may be engaged with the V-shaped metal terminals. Also in that case, soldering may be performed to make the electric connections more securely.

When the one end portion 51a and the other end portion 51b of the coil 51 are thus electrically connected to the terminal member 843 and the terminal member 844, the resonance circuit is formed because the terminal member 843 and the terminal member 844 are connected to the capacitor 103 on the printed circuit board 10, and the variable capacitance capacitor formed by the pressure sensor 83 is connected in parallel with the resonance circuit. This eliminates a need for extending the one end portion 51a and the other end portion 51b of the coil 51 to the printed circuit board 10 and soldering the one end portion 51a and the other end portion 51b of the coil 51 on the board surface 10a of the printed circuit board 10.

After the pen pressure detection module 8 and the board holder 9 retaining the printed circuit board 10 are coupled to each other as described above, the parts of connection of the terminal member 843 and the terminal member 844 of the connecting portion 842 of the pen pressure detector 81 to the conductor pattern 101 and the conductor pattern 102 on the board surface 10a of the printed circuit board 10 are soldered as required. Thereafter, as shown in FIG. 5A and FIG. 9A, a resin molded member 110 covers the board surface 10a of the printed circuit board 10 housed in the board housing portion 91 of the board holder 9, with the exclusion of the part of the side switch 104 to enable the pressing of the side switch 104.

Then, the pen module part, in which the coil member 5, the pen pressure detector 8, and the board holder 9 retaining the printed circuit board 10 described above are coupled to each other to form one module, is housed within the hollow portion of the case 2 of the electronic pen 1. The depression operating element 22 that depresses the side switch 104 is attached at the time of housing the pen module part into the hollow portion of the case 2.

Figure 9A:
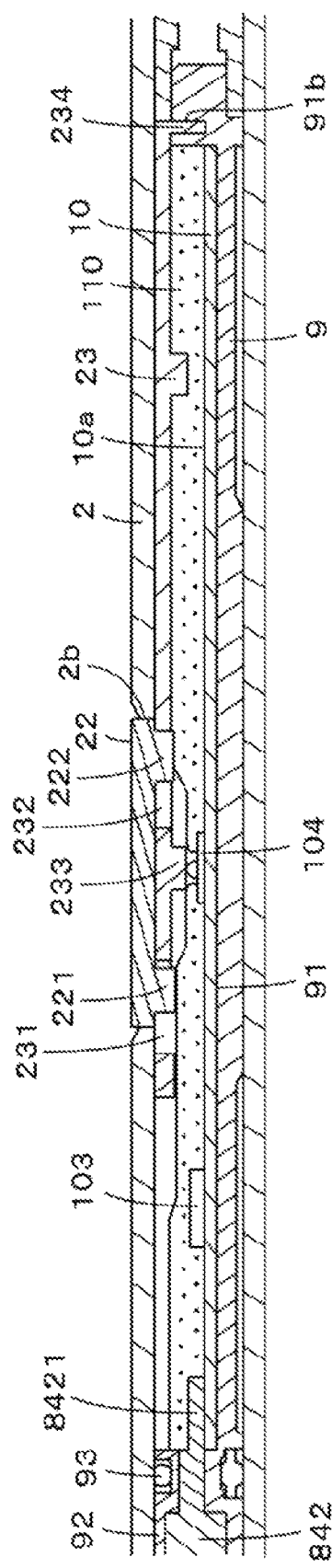
FIGS. 9A, 9B, and 9C are diagrams of parts of an internal configuration of an electronic pen according to one or more embodiments of the present disclosure.
Figure 9B:
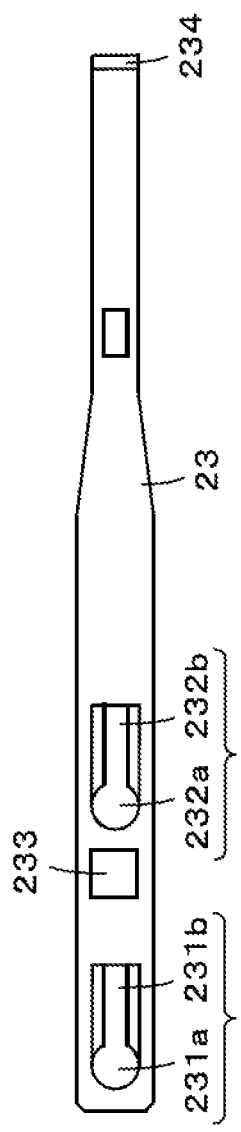
Figure 9C:
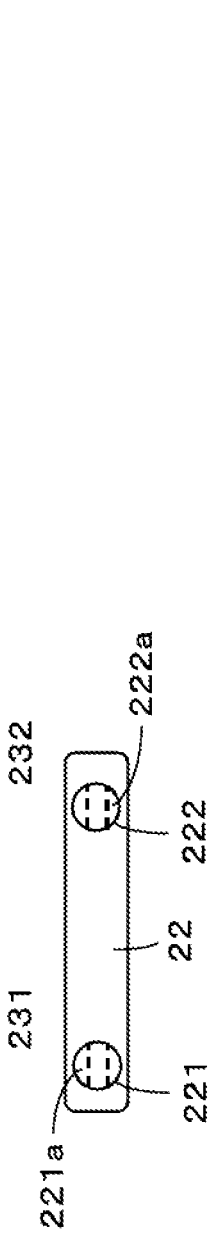

FIG. 9A is a sectional view of a part in which the board holder 9 is housed within the case 2. In addition, FIG. 9B is a view of an attachment member 23 for the side switch 104, the attachment member 23 being viewed from a surface side thereof opposed to the printed circuit board 10. In addition, FIG. 9C is a view of the depression operating element 22 for the side switch 104, the depression operating element 22 being viewed from a surface side thereof opposed to the printed circuit board 10.

As shown in FIG. 9A, a through hole 2b for disposing the depression operating element 22 is formed in the case 2. The depression operating element 22 is formed of a resin, for example. As shown in FIG. 9C, the depression operating element 22 is formed in a shape that precisely fits into the through hole 2b of the case 2. As shown in FIGS. 9A and 9C, cylindrical projecting portions 221 and 222 engaged with the attachment member 23 are formed on a surface of the depression operating element 22 which surface is opposite the printed circuit board 10.

The attachment member 23 is formed of a material having elasticity, or a resin in the present example. Through holes 231 and 232 with which the projecting portions 221 and 222 of the depression operating element 22 are engaged are formed in the attachment member 23, and a projecting portion 233 for depression of the side switch 104 is formed on the attachment member 23. The through holes 231 and 232 of the attachment member 23 include circular parts 231a and 232a having a same diameter as the diameter of the projecting portions 221 and 222 of the depression operating element 22, and linear holes 231b and 232b having a width shorter than the diameter of the projecting portions 221 and 222.

Formed at base positions of the cylindrical projecting portions 221 and 222 of the depression operating element 22 are cutaway portions 221a and 222a (see dotted lines in FIG. 9C) that engage with the linear holes 231b and 232b of the through holes 231 and 232 of the attachment member 23 so that the depression operating element 22 does not fall off the attachment member 23. Incidentally, the linear holes 231b and 232b of the through holes 231 and 232 of the attachment member 23 are formed so as to be slightly thinner than the other parts of the attachment member 23, in accordance with the cutaway portions 221a and 222b at the base positions of the cylindrical projecting portions 221 and 222 of the depression operating element 22.

As shown in FIG. 9A and FIG. 2, a recessed hole 91b for locking the attachment member 23 is provided at an end portion of the board holder 9 which end portion is on the case cap 21 side. On the other hand, as shown in FIGS. 9A and 9B, a bent projecting portion 234 fitted in the recessed hole 91b is formed on an end portion in a longitudinal direction of the attachment member 23.

Prior to housing of the pen module part into the case 2, as shown in FIG. 9A, the projecting portion 233 of the attachment member 23 is set in a state of being able to depress the side switch 104, the bent projecting portion 234 of the attachment member 23 is fitted into the recessed hole 91b of the board holder 9, and the attachment member 23 is attached onto the printed circuit board 10 covered by the resin molded member 110 in the board holder 9.

Next, the pen module part to which the attachment member 23 is attached is housed into the case 2 from an opposite side from an opening portion 2a on the pen tip side. Then, when the parts of the through holes 231 and 232 of the attachment member 23 attached to the pen module part can be seen from the through hole 2b of the case 2, the depression operating element 22 is inserted into the through hole 2b of the case 2, and the projecting portions 221 and 222 of the depression operating element 22 are inserted into and engaged with the circular parts 231a and 232a of the through holes 231 and 232 of the attachment member 23.

The pen module part is further pushed into the case 2. Then, the projecting portions 221 and 222 of the depression operating element 22 which projecting portions are inserted in the circular parts 231a and 232a of the through holes 231 and 232 of the attachment member 23 are engaged with the linear holes 231b and 232b of the through holes 231 and 232 of the attachment member 23. Thus, the depression operating element 22 is engaged with the attachment member 23, and is prevented from falling off the attachment member 23. As described above, the depression operating element 22 is attached by being engaged with the attachment member 23 when the pen module part is housed into the case 2.

In this case, as described earlier, in the vicinity of an opening portion of the pen module part which opening portion is on the pen tip side of the hollow portion of the case 2, the cap member 4 is disposed in such a manner as to cover the tapered portion 52b of the ferrite core 52. As described earlier, the cap member 4 is formed of an elastic rubber, and constitutes a first sealing member that provides sealing so as to eliminate a gap between the front end side of the ferrite core 52 of the coil member 5 and the inner wall surface of the hollow portion of the case 2.

Figure 8:
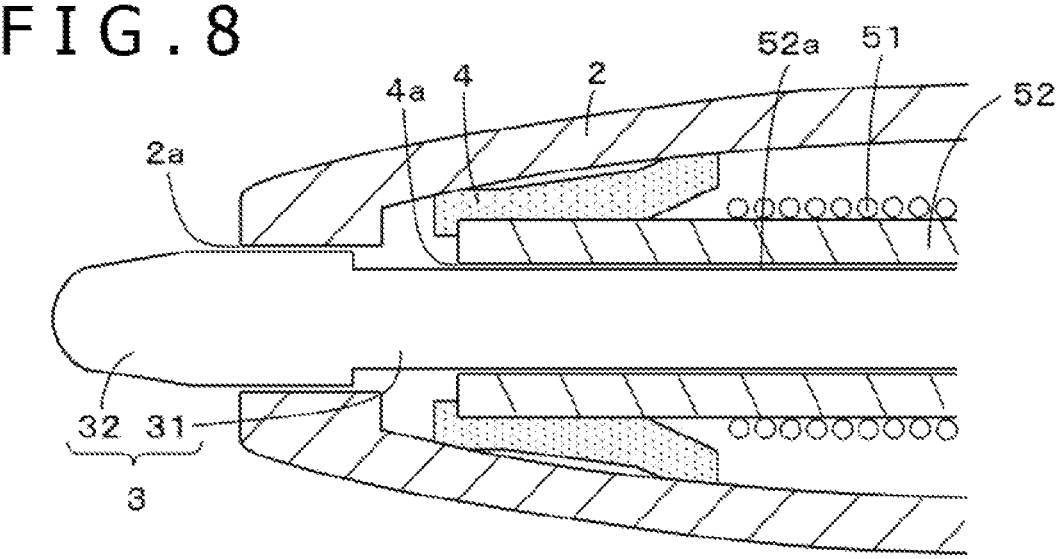
FIG. 8 is a diagram of parts of an internal configuration of an electronic pen according to one or more embodiments of the present disclosure.

FIG. 8 is a sectional view showing the opening portion 2a side of the case 2 of the electronic pen 1 when the pen module part is housed in the hollow portion within the case 2. In this case, the pen module part is pressed to the opening portion 2a side of the case 2 by the case cap 21 when the case cap 21 is fitted to the case 2. The tapered portion 52b of the ferrite core 52 of the coil member 5 therefore presses the cap member 4 to the inner wall side of the case 2. Sealing is thereby provided so as to eliminate the gap between the tapered portion 52b and the inner wall of the case 2. The cap member 4 in the present example has a flared skirt shape, as described above. Therefore, as shown in FIG. 8, the cap member 4 and the inner wall surface of the case 2 are in close contact with each other at two positions, so that a dustproof effect and a waterproof effect of the sealing are improved.

The sealing by the cap member 4 on the opening portion 2a side of the case 2 separates the space of the through hole 52a of the ferrite core 52 from the space of the hollow portion in which the pen module part is housed within the case 2.

That is, as described earlier, in the present example, the coil member 5, the coil member holder 6, and the pen pressure transmission member 82 are fitted and coupled to each other, and thereby constitute the core body insertion member. The hollow space of the core body insertion member is constituted of the through hole 52a of the ferrite core 52 of the coil member 5, the recessed hole 61a and the through hole 62a of the coil member holder 6, and the hollow portion 821a of the pen pressure transmission member 82, and is closed by the barrier 822 of the pen pressure transmission member 82.

In this case, in a fitting portion in which the projecting portion 62 of the coil member holder 6 is fitted in the pen pressure transmission member 82, the ring-shaped projecting portions 621 and 622 of the coil member holder 6 are in close contact with the inner wall of the hollow portion 821a of the pen pressure transmission member 82 without a gap therebetween, so that sealing is ensured. Thus, the hollow space of the core body insertion member is an independent space isolated from the rest, except for the opening side of the through hole 52a of the ferrite core 52. Neither electric parts nor electric connection parts are present within the hollow space of the core body insertion member. It is therefore unnecessary to ensure a waterproof property and a dustproof property in the hollow space of the core body insertion member.

On the tapered portion 52b side of the ferrite core 52 which tapered portion is an end portion on the tip end portion 32 side of the core body insertion member, as described above with reference to FIG. 8, the sealing between the tapered portion 52b side of the ferrite core 52 and the inner wall of the case 2, which sealing is provided by the cap member 4, separates the hollow space of the core body insertion member from the space of the hollow portion in which the pen module part is housed within the case 2.

Hence, even when dust or water enters the hollow space of the core body insertion member, the dust or the water does not enter the space of the hollow portion in which the pen module part is housed within the case 2. Therefore, it becomes unnecessary to provide sealing between the core body 3 and the hollow space of the core body insertion member, and a waterproof property and a dustproof property of the electronic pen 1 can be ensured even when the core body 3 is freely moved in the axial direction.

In a state in which the pen module part is housed within the case 2, as shown in FIG. 5A and FIG. 9A, the sealing member 93 provided on the fitting portion 92 of the board holder 9 which fitting portion is fitted with the pen pressure detection module 8 is in close contact with the inner wall surface of the case 2, and provides sealing so as to separate the hollow portion of the case 2 into the pen tip side of the fitting portion 92 and the case cap 21 side of the fitting portion 92.

As described earlier, on the pen tip side, the cap member 4 seals off the space of the hollow portion of the case 2 from the external space. Hence, a space on the pen tip side of the fitting portion 92 in the hollow portion within the case 2 is a sealed space in which a waterproof property and a dustproof property are ensured by first sealing by the cap member 4 and second sealing by the sealing member 93 of the fitting portion 92.

Hence, water and dust from the external space on the opening portion 2a side as the pen tip side of the electronic pen 1 are prevented from entering the space on the pen tip side of the fitting portion 92 in the hollow portion within the case 2, and water and dust are prevented from entering through the through hole 2b in the part in which the depression operating element 22 for the side switch 104 is disposed. As described above, the pressure sensor 83 is disposed in the space on the pen tip side of the fitting portion 92 in the hollow portion within the case 2, and also arranged therein are the parts of connection of the coil 51 to the pressure sensor 83 and the parts of connection to the capacitor 103, the side switch 104, and the capacitor 105 on the printed circuit board 10. A waterproof property and a dustproof property of these parts can be ensured.

On the case cap 21 side of the fitting portion 92 in the hollow portion within the case 2, the resin molded member 110 covers the board surface 10a of the printed circuit board 10. Thus, even when water and dust enter through the through hole 2b in the part in which the depression operating element 22 for the side switch 104 is disposed, a waterproof property and a dustproof property of electronic parts on the board surface 10a of the printed circuit board 10 are ensured.

Incidentally, in the present embodiment, as a result of the coil member 5 being fitted to the pen pressure transmission member 82 of the pen pressure detection module 8 via the coil member holder 6, the center line position in the axial direction of the pen pressure detection module 8 and the center line position in the axial direction of the ferrite core 52 of the coil member 5 coincide with each other. Then, when the pen pressure detection module 8 is fitted to the fitting portion 92 of the board holder 9, and the pen pressure detection module 8 is thereby coupled to the printed circuit board 10, the pen pressure detection module 8 is coupled at a predetermined position to the board holder 9 and the printed circuit board 10. In addition, in a state in which the pen module part is housed within the hollow portion of the case 2, the board holder 9 is coupled to the case cap 21 such that the center line position in the axial direction of the pen pressure detection module 8 and the center line position in the axial direction of the ferrite core 52 coincide with the center line position in the axial direction of the hollow portion of the case 2.

Then, the core body main body portion 31 of the core body 3 is inserted through the opening portion 2a (see FIG. 8) of the case 2 and the opening 4a of the cap member 4 and further inserted through the through hole 52a of the ferrite core 52, and is fitted into the pressing member 7 within the pen pressure transmission member 82 of the pen pressure detection module 8.

As described above, according to the present embodiment, the first sealing and the second sealing for a waterproof property and a dustproof property of the electronic pen 1 can be provided by merely housing the pen module part within the case 2. According to the present embodiment, the hollow space of the core body insertion member formed by the coil member 5, the coil member holder 6, and the pen pressure transmission member 82 of the pen pressure detection module 8 is not sealed off from the outside. The core body 3 can therefore move freely in the axial direction.

According to the above-described embodiment, by merely fitting the pen pressure detection module 8 to the board holder 9 to which the printed circuit board 10 is locked, the two terminal members 843 and 844 of the pen pressure detector 8 are in contact with and electrically connected to the conductor patterns 101 and 102 formed on the board surface 10a of the printed circuit board 10. That is, alignment for electric connection between the two terminal members 843 and 844 of the pen pressure detection module 8 and the conductor patterns 101 and 102 on the printed circuit board 10 is automatically performed by merely fitting the pen pressure detection module 8 to the fitting portion 92 of the board holder 9.

[Circuit Configuration for Detecting Position and Pen Pressure of Electronic Pen 1 in Position Detecting Device 202]

Figure 10:
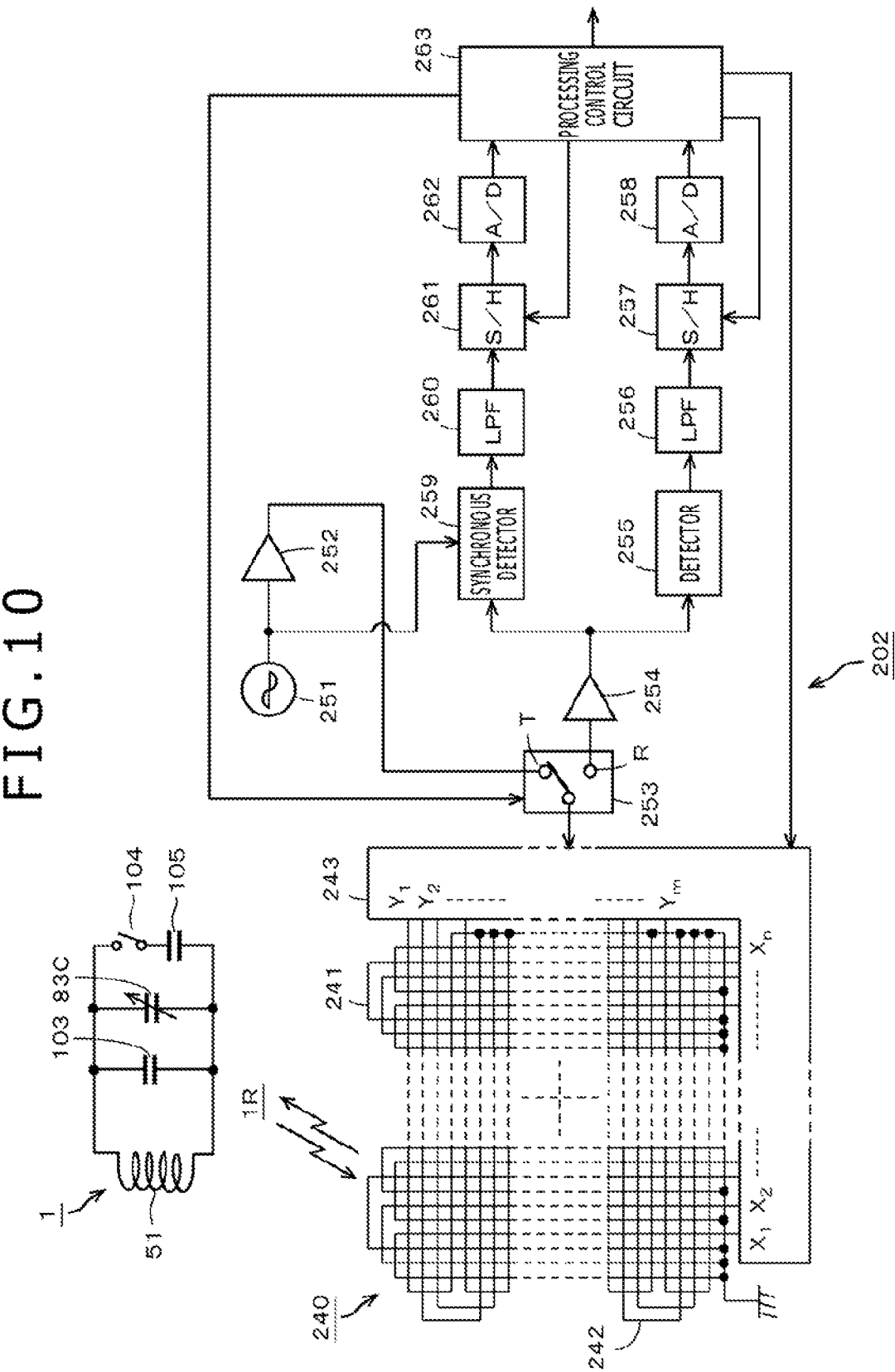
FIG. 10 is a diagram showing an example circuit configuration of a position detecting device used in conjunction with an electronic pen according to one or more embodiments of the present disclosure.

An example of a circuit configuration in the position detecting device 202 that detects an indicated position and detects a pen pressure by using the electronic pen 1 according to the above-described embodiment will next be described with reference to FIG. 10. FIG. 10 is a block diagram showing an example of circuit configuration of the position detecting device 202 in the present example.

The electronic pen 1 includes a resonance circuit 1R formed by a parallel circuit of the coil 51, the capacitor 103, a variable capacitance capacitor 83C formed by the pressure sensor 83 of the pen pressure detector 81 of the pen pressure detector 8, and a series circuit of the side switch 104 and the capacitor 105. In this case, the capacitance of the variable capacitance capacitor 83C formed by the pressure sensor 83 of the pen pressure detector 81 changes according to an applied pen pressure. The resonance frequency of the resonance circuit 1R therefore changes according to the pen pressure. In addition, the resonance frequency of the resonance circuit 1R is changed by controlling whether or not to connect the capacitor 105 to the resonance circuit 1R by turning the side switch 104 on or off.

The position detecting device 202 detects a position on a sensor which position is indicated by the electronic pen 1 from a position on the sensor where a signal received from the resonance circuit 1R of the electronic pen 1 by electromagnetic coupling is detected, and detects a pen pressure applied to the core body 3 of the electronic pen 1 by detecting a change in phase of the signal received from the resonance circuit 1R of the electronic pen 1 by electromagnetic coupling and thereby detecting a change in the resonance frequency.

The position detecting device 202 has a position detecting coil 240 formed thereon by stacking an X-axis direction loop coil group 241 and a Y-axis direction loop coil group 242. The position detecting device 202 is also provided with a selection circuit 243 to which the X-axis direction loop coil group 241 and the Y-axis direction loop coil group 242 are connected. The selection circuit 243 sequentially selects one loop coil of the two loop coil groups 241 and 242.

The position detecting device 202 further includes an oscillator 251, a current driver 252, a switching connecting circuit 253, a receiving amplifier 254, a detector 255, a low-pass filter 256, a sample and hold circuit 257, an analog to digital (A/D) conversion conversion circuit 258, a synchronous detector 259, a low-pass filter 260, a sample and hold circuit 261, an A/D conversion circuit 262, and a processing control circuit 263. The processing control circuit 263 is formed by a microcomputer.

The oscillator 251 generates an alternating-current signal of a frequency f0. The oscillator 251 then supplies the generated alternating-current signal to the current driver 252 and the synchronous detector 259. The current driver 252 converts the alternating-current signal supplied from the oscillator 251 into a current, and sends out the current to the switching connecting circuit 253. The switching connecting circuit 253 selects a connection destination (a transmission side terminal T or a receiving side terminal R) to which to connect the loop coil selected by the selection circuit 243, under control of the processing control circuit 263. Of the connection destinations, the transmission side terminal T is connected with the current driver 252, and the receiving side terminal R is connected with the receiving amplifier 254.

An induced voltage generated in the loop coil selected by the selection circuit 243 is sent to the receiving amplifier 254 via the selection circuit 243 and the switching connecting circuit 253. The receiving amplifier 254 amplifies the induced voltage supplied from the loop coil, and sends out the amplified induced voltage to the detector 255 and the synchronous detector 259.

The detector 255 detects the induced voltage generated in the loop coil, that is, a received signal, and sends out the received signal to the low-pass filter 256. The low-pass filter 256 has a cutoff frequency sufficiently lower than the above-mentioned frequency f0. The low-pass filter 256 converts the output signal of the detector 255 into a direct-current signal, and sends out the direct-current signal to the sample and hold circuit 257. The sample and hold circuit 257 holds a voltage value of the output signal of the low-pass filter 256 in predetermined timing, specifically predetermined timing during a reception period, and sends out the voltage value to the A/D conversion circuit 258. The A/D conversion circuit 258 converts the analog output of the sample and hold circuit 257 into a digital signal, and outputs the digital signal to the processing control circuit 263.

Meanwhile, the synchronous detector 259 performs synchronous detection of the output signal of the receiving amplifier 254 by the alternating-current signal from the oscillator 251, and sends out, to the low-pass filter 260, a signal having a level corresponding to a phase difference between the output signal of the receiving amplifier 254 and the alternating-current signal from the oscillator 251. The low-pass filter 260 has a cutoff frequency sufficiently lower than the frequency f0. The low-pass filter 260 converts the output signal of the synchronous detector 259 into a direct-current signal, and sends out the direct-current signal to the sample and hold circuit 261. The sample and hold circuit 261 holds a voltage value of the output signal of the low-pass filter 260 in predetermined timing, and sends out the voltage value to the A/D conversion circuit 262. The A/D conversion circuit 262 converts the analog output of the sample and hold circuit 261 into a digital signal, and outputs the digital signal to the processing control circuit 263.

The processing control circuit 263 controls various parts of the position detecting device 202. Specifically, the processing control circuit 263 controls the selection of a loop coil in the selection circuit 243, the switching of the switching connecting circuit 253, and the timing of the sample and hold circuits 257 and 261. The processing control circuit 263 makes a radio wave transmitted from the X-axis direction loop coil group 241 and the Y-axis direction loop coil group 242 for a certain transmission duration on the basis of the input signals from the A/D conversion circuits 258 and 262.

A radio wave transmitted from the electronic pen 1 generates an induced voltage in each of loop coils of the X-axis direction loop coil group 241 and the Y-axis direction loop coil group 242. The processing control circuit 263 calculates the coordinate values of an indicated position in an X-axis direction and a Y-axis direction which position is indicated by the electronic pen 1 on the basis of the level of the voltage value of the induced voltage generated in each of the loop coils. In addition, the processing control circuit 263 detects a pen pressure on the basis of the level of the signal corresponding to the phase difference (frequency shift) between the transmitted radio wave and the received radio wave. Further, the processing control circuit 263 detects whether the side switch 104 is in an on state or in an off state on the basis of the level of the signal corresponding to the phase difference (frequency difference) between the transmitted radio wave and the received radio wave.

Other Embodiments

The above description has been made of a case where the present disclosure is applied to an electromagnetic induction type electronic pen. However, the present disclosure is also applicable to an active capacitive pen, which is an example of a capacitive type electronic pen. In an electronic pen as an example of the active capacitive pen to be described in the following, a coil wound around a ferrite core is a part of a charging circuit that charges a power supply of a signal transmission circuit included in the active capacitive pen.

Figure 11:
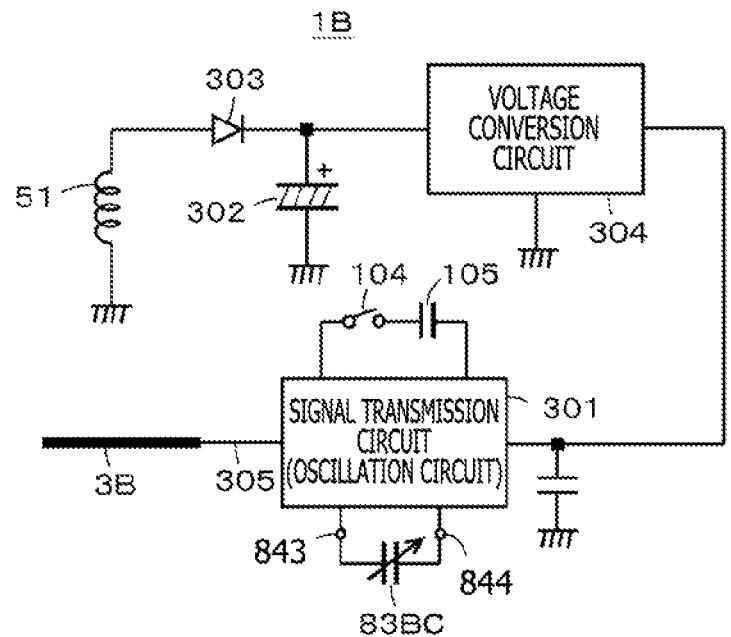
FIG. 11 is a diagram of assistance in explaining an example of constitution of another embodiment of the electronic pen according to one or more embodiments of the present disclosure.

FIG. 11 shows an example of circuit configuration of an electronic pen 1B having a configuration of the active capacitive pen in the present example. In the electronic pen 1B having the configuration of the active capacitive pen, a core body 3B has the constitution of an electrode core formed of a conductor, for example, a conductive metal or a hard resin mixed with a conductive powder. In the following description, the core body 3B will be referred to as an electrode core 3B.

Incidentally, though not shown, in the electronic pen 1B, a barrier 822 of a pen pressure transmission member 82 is formed by a conductive member, and a pressing member 7 is also formed by a member having conductivity. An insulating film for insulation from the pen pressure transmission member 82 is formed on a surface of a conductive elastic body 833 of a pressure sensor 83 which surface corresponds to the barrier 822. Terminal members configured as three-dimensional fine patterns as in the case of the terminal members 843 and 844 are formed on a holder 84 of a pen pressure detector 81 so as to be electrically connected to the barrier 822. The barrier 822 is configured to be electrically connected to the terminal members when the pen pressure transmission member 82 and the pen pressure detector 81 are engaged with each other.

A signal transmission circuit (integrated circuit (IC)) that feeds the electrode core 3B is provided on a board surface 10a of a printed circuit board 10. A connecting portion 842 of the holder 84 of the pen pressure detector 81 is formed such that the terminal members electrically connected to the barrier 822 are electrically connected to the signal transmission circuit.

In the present example, as shown in FIG. 11, an electronic circuit formed on the printed circuit board 10 has a circuit configuration including the above-described signal transmission circuit 301, an electric double layer capacitor 302 as an example of a storage element that generates a driving voltage (power supply voltage) for driving the signal transmission circuit 301, a rectifying diode 303, and a voltage conversion circuit 304. The signal transmission circuit 301 in the present example is formed by an oscillating circuit.

As in the foregoing embodiment, the electrode core 3B is inserted through a through hole 52a of a ferrite core 52 of a coil member 5 and is fitted into the pressing member 7 having conductivity within the pen pressure transmission member 82 of a pen pressure detector 8, and presses the barrier 822 having conductivity via the pressing member 7 having conductivity. The electrode core 3B is electrically connected to the signal transmission circuit 301 on the printed board, as described earlier.

As shown in FIG. 11, the two terminal members 843 and 844 of the pen pressure detection module 8 are electrically connected to the signal transmission circuit 301 formed on the printed circuit board. The oscillating circuit constituting the signal transmission circuit 301 generates a signal whose frequency changes according to the capacitance of a variable capacitance capacitor 83BC of the pressure sensor 83 in the pen pressure detector 81, and supplies the generated signal to the electrode core 3B. In addition, the signal transmission circuit 301 generates a signal whose frequency changes according to an on or off state of the side switch 104, and supplies the generated signal to the electrode core 3B.

When the electronic pen 1B in the present example is mounted on a charger not shown in the figures, an induced electromotive force is generated in a coil 51 due to an alternating magnetic field generated by the charger, and charges the electric double layer capacitor 302 via the diode 303. The voltage conversion circuit 304 converts a voltage stored in the electric double layer capacitor 302 to a fixed voltage, and supplies the fixed voltage as power to the signal transmission circuit 301.

When the electronic pen 1B as a capacitive type stylus pen in the present example performs normal operation (when the electronic pen 1B does not perform charging operation), the coil 51 is at a fixed potential (ground potential (GND) in the present example), and therefore acts as a shield electrode provided around the periphery of the electrode core 3B. Incidentally, the fixed potential of the coil 51 when the capacitive type stylus pen performs normal operation is not limited to the ground potential, but may be a positive side potential of the power supply, or may be a potential intermediate between the positive side potential of the power supply and the ground potential.

The signal transmission circuit (oscillating circuit) 301 generates a signal whose frequency changes according to the capacitance of the variable capacitance capacitor 83BC formed by the pressure sensor 83 of the pen pressure detector 81 or a signal whose frequency changes according to an on or off state of the side switch 104, and supplies the generated signal to the electrode core 3B. The signal from the signal transmission circuit 301 is radiated from the electrode core 3B as an electric field based on the signal. The oscillating circuit constituting the signal transmission circuit 301 is formed by an inductance-capacitance (LC) oscillating circuit using resonance by a coil and a capacitor, for example. A position detecting device that detects the coordinate position of the capacitive type stylus pen as an example of the electronic pen 1B according to the present embodiment can determine a pen pressure applied to the electrode core 3B on the basis of the frequency of the signal.

Figure 12:
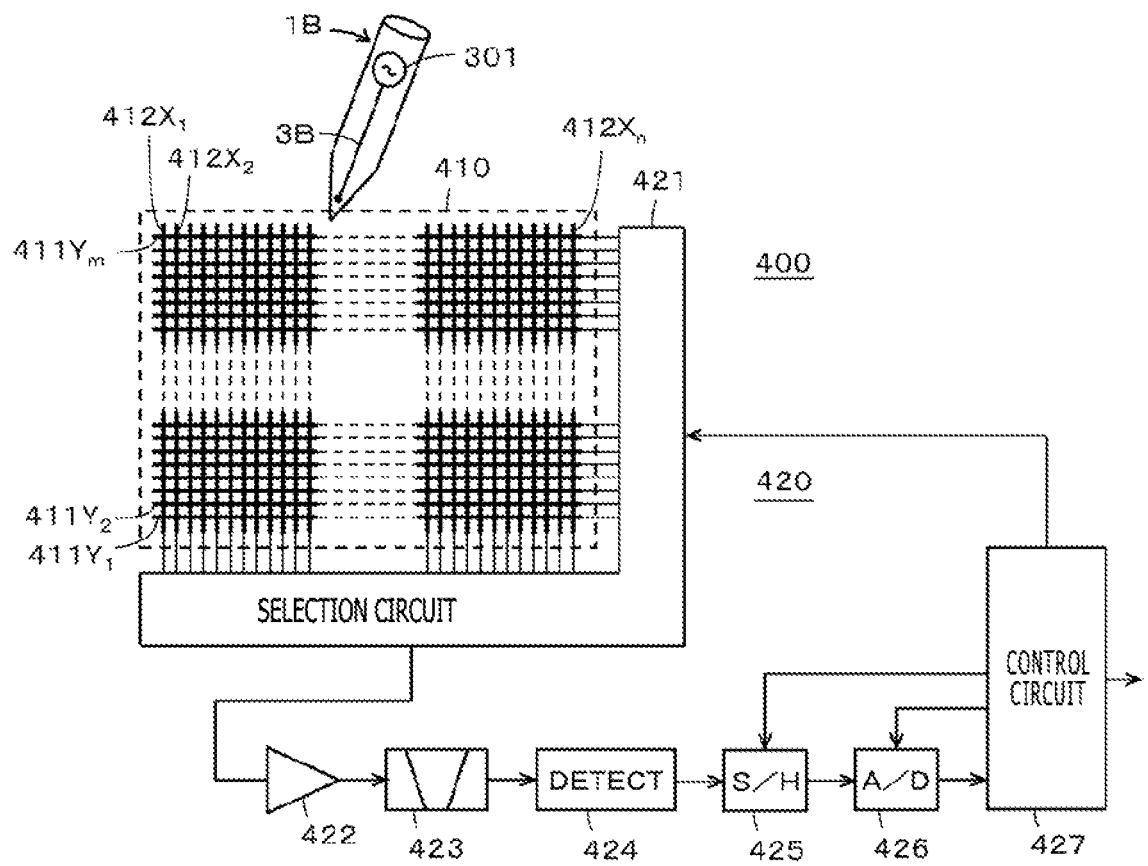
FIG. 12 is a diagram showing an example circuit configuration of a position detecting device used in conjunction with an electronic pen according to one or more embodiments of the present disclosure.

FIG. 12 is a block diagram of assistance in explaining a position detecting device 400 that receives the signal from the electronic pen 1B having the configuration of the capacitive type stylus pen, and detects a position on a sensor and detects a pen pressure.

As shown in FIG. 12, the position detecting device 400 according to the present embodiment is constituted of a sensor 410 and a pen detecting circuit 420 connected to the sensor 410. Though a sectional view of the sensor 410 is omitted in the present example, the sensor 410 is formed by stacking a first conductor group 411, an insulating layer (not shown), and a second conductor group 412 in order from a bottom layer side. The first conductor group 411 is, for example, a plurality of first conductors $411Y_1, 411Y_2, \ldots, 411Y_m$ (m is an integer of one or more) that extend in a horizontal direction (X-axis direction) and which are arranged in parallel with each other in a Y-axis direction so as to be separated from each other at predetermined intervals.

The second conductor group 412 is a plurality of second conductors $412X_1, 412X_2, \ldots, 412X_n$ (n is an integer of one or more) that extend in a direction intersecting the extending direction of the first conductors $411Y_1, 411Y_2, \ldots, 411Y_m$, or in a vertical direction (Y-axis direction) orthogonal to the extending direction of the first conductors $411Y_1, 411Y_2, \ldots, 411Y_m$ in the present example, and which are arranged in parallel with each other in the X-axis direction so as to be separated from each other at predetermined intervals.

Thus, the sensor 410 of the position detecting device 400 has a configuration that detects a position indicated by the electronic pen 1B by using a sensor pattern formed by making the first conductor group 411 and the second conductor group 412 intersect each other.

Incidentally, in the following description, when each conductor of the first conductors $411Y_1, 411Y_2, \ldots, 411Y_m$ does not need to be distinguished from the other conductors, the conductor will be referred to as a first conductor 411Y. Similarly, when each conductor of the second conductors $412X_1, 412X_2, \ldots, 412X_n$ does not need to be distinguished from the other conductors, the conductor will be referred to as a second conductor 412X.

The pen detecting circuit 420 includes a selection circuit 421 as an input-output interface with the sensor 410, an amplifier circuit 422, a band-pass filter 423, a detecting circuit 424, a sample and hold circuit 425, an A/D conversion circuit 426, and a control circuit 427.

The selection circuit 421 selects one conductor 411Y or 412X from the first conductor group 411 and the second conductor group 412 on the basis of a control signal from the control circuit 427. The conductor selected by the selection circuit 421 is connected to the amplifier circuit 422. A signal from the electronic pen 1B is detected by the selected conductor, and is amplified by the amplifier circuit 422. The output of the amplifier circuit 422 is supplied to the band-pass filter 423, where only a frequency component of the signal transmitted from the electronic pen 1B is extracted.

The output signal of the band-pass filter 423 is detected by the detecting circuit 424. The output signal of the detecting circuit 424 is supplied to the sample and hold circuit 425 to be sampled and held in predetermined timing according to a sampling signal from the control circuit 427, and is thereafter converted into a digital value by the A/D conversion circuit 426. The digital data from the A/D conversion circuit 426 is read and processed by the control circuit 427.

The control circuit 427 operates so as to send out respective control signals to the sample and hold circuit 425, the A/D conversion circuit 426, and the selection circuit 421 according to a program stored in an internal read-only memory (ROM). From the digital data from the A/D conversion circuit 426, the control circuit 427 calculates position coordinates on the sensor 410 which position coordinates are indicated by the electronic pen 1B, and detects a pen pressure detected by the pen pressure detector of the electronic pen 1B.

As a flow of operation, the control circuit 427 supplies a selection signal to the selection circuit 421 to select each of the second conductors 412X, and reads data output from the A/D conversion circuit 426 as a signal level.

When a signal having a level equal to or higher than a predetermined value is detected from any of the second conductors 412X, the control circuit 427 stores the numbers of a second conductor 412X from which a highest signal level is detected and a plurality of second conductors 412X adjacent to the second conductor 412X from which the highest signal level is detected. Similarly, the control circuit 427 controls the selection circuit 421, and stores the numbers of a first conductor 411Y from which a highest signal level is detected among the first conductors 411Y and a plurality of first conductors 411Y adjacent to the first conductor 411Y from which the highest signal level is detected. Then, the control circuit 427 detects a position on the sensor 410 which position is indicated by the electronic pen 1B from the numbers of the second conductors 412X and the numbers of the first conductors 411Y which numbers are stored as described above.

In addition, the control circuit 427 detects the frequency of a signal from the A/D conversion circuit 426, and detects a pen pressure value detected by the pen pressure detector 81 of the electronic pen 1B from the detected frequency. Specifically, as described earlier, the oscillation frequency of the oscillating circuit constituting the signal transmission circuit 301 of the electronic pen 1B is a frequency corresponding to the capacitance of the variable capacitance capacitor 83BC formed by the pressure sensor 83 of the pen pressure detector 81. The control circuit 427, for example, has the information of a correspondence table of oscillation frequencies of the oscillating circuit constituting the signal transmission circuit 301 of the electronic pen 1B and pen pressure values, and detects a pen pressure value from the information of the correspondence table.

Incidentally, in the above-described example, the electronic pen 1B converts the pen pressure detected by the pressure sensor 83 of the pen pressure detector 81 into a frequency, and supplies the frequency to the electrode core 3B. However, a signal attribute to which the pen pressure is made to correspond is not limited to the frequency, but the pen pressure may be made to correspond to the phase of the signal, the number of times of interruption of the signal, or the like.

In addition, while the coil 51 wound around the ferrite core is used as a coil for charging in the electronic pen 1B having the configuration of the active capacitive pen in the above-described example, a cell (battery) may be included as a source of supply of the power supply voltage for the signal transmission circuit 301. In that case, the ferrite core wound with the coil is not necessary. Then, in that case, a constitution can be formed in which a hollow tubular body constituting a shield electrode for the electrode core 3B is provided in place of the coil member, and the tubular body is fitted to the pen pressure transmission member 82 via a holding member for the tubular body.

In addition, in the electronic pen 1B having the configuration of the active capacitive pen in the above-described example, the signal transmission circuit 301 is configured as only the oscillating circuit, and a pen pressure is transmitted as a change in the oscillation frequency of the oscillating circuit to the position detecting device. However, the signal transmission circuit may be formed by an oscillating circuit and a circuit that applies a predetermined modulation to the oscillating signal of the oscillating circuit, and pen pressure information may be transmitted as for example an amplitude-shift keying (ASK) signal or the like to the position detecting device.

OTHER EMBODIMENTS OR MODIFICATIONS

In the foregoing embodiment, the case 2 is the external casing of the electronic pen. However, the above-described case 2 may be a case (casing) of an electronic pen cartridge housed within an external casing of an electronic pen. In that case, a waterproof property and a dustproof property of the electronic pen cartridge are ensured, and there is no need for a sealing constitution related to a waterproof property and a dustproof property for the external casing of the electronic pen. In the case of the constitution of the electronic pen cartridge, the electronic pen cartridge can be configured as a push-action refill. In that case, an end portion of the case (casing) of the electronic pen cartridge which end portion is on an opposite side from a pen tip side of the case (casing) has the constitution of a fitting portion fitted to a push mechanism.

In the foregoing embodiment, the variable capacitance capacitor formed by the pressure sensor of the pen pressure detector is not limited to variable capacitance capacitors having a mechanical constitution formed by combining a plurality of parts as in the above-described example, but can have a one-part constitution using a semiconductor element whose capacitance is variable according to a pen pressure, as disclosed in Japanese Patent Laid-Open No. 2013-161307, for example.

In addition, the pressure sensor of the pen pressure detector in the foregoing embodiment uses the variable capacitance capacitor whose capacitance is variable according to a pen pressure. However, it is needless to say that the pressure sensor of the pen pressure detector may make variable an inductance value or a resistance value as a changing element that changes the resonance frequency of the resonance circuit.

It is to be noted that the embodiment of the present disclosure is not limited to the foregoing embodiments, and that various changes can be made without departing from the spirit of the present disclosure.

What is claimed is:

1. An electronic pen comprising:
    a casing;
    an opening portion formed on one side of the casing;
    a core body that projects outside of the casing through the opening portion;
    a pen pressure detector which, in operation, detects a pen pressure applied to the core body; and
    a core body insertion member disposed in the casing and having a hollow space that houses the core body, the hollow space including a hollow portion between the core body insertion member and the core body when the core body insertion member houses the core body, the hollow portion communicating, via the opening portion, with a first space external to the electronic pen, and the hollow portion separated from a second space in which the pen pressure detector is disposed.

2. The electronic pen according to claim 1, wherein the core body insertion member has a barrier that separates the hollow portion from the pen pressure detector and the barrier is adjacent to the pen pressure detector.

3. The electronic pen according to claim 2, wherein, in operation, the pen pressure applied to the core body is transmitted to the pen pressure detector by elastic displacement of the barrier based on movement of the core body according to the pen pressure.

4. The electronic pen according to claim 2, wherein the barrier is formed by an elastic member.

5. The electronic pen according to claim 2, wherein a pressing member is fitted on a side of the core body, and the core body presses the barrier of the core body insertion member via the pressing member according to the applied pen pressure.

6. The electronic pen according to claim 1, wherein the pen pressure detector is coupled to the core body insertion member.

7. The electronic pen according to claim 1, wherein a sealing member separates the hollow portion from the second space.

8. The electronic pen according to claim 1, wherein a sealing member is disposed between the first space and the second space.

9. The electronic pen according to claim 1, wherein a magnetic core houses the core body and a sealing member is disposed on the magnetic core.

10. The electronic pen according to claim 9, wherein the sealing member is a cap-shaped elastic member.

11. The electronic pen according to claim 1, wherein:
    a circuit board disposed on a first side of the pen pressure detector, the first side being opposite to a second side of the pen pressure detector, the core body insertion member being disposed on the second side of the pen pressure detector,
    a coupling portion that couples the circuit board to the pen pressure detector, and
    a sealing member that closes a gap between the coupling portion and an inner wall of the casing.

12. The electronic pen according to claim 11, wherein the circuit board is disposed in a board holder and the board holder has a fitting portion fitted to the pen pressure detector, and the sealing member is formed on the fitting portion of the board holder.

13. The electronic pen according to claim 12, wherein a terminal of the pen pressure detector is connected to the circuit board retained in the board holder through the fitting portion of the board holder, and a capacitor connected in parallel with the coil constituting a resonance circuit is disposed on the circuit board.

14. The electronic pen according to claim 1, wherein:
    a circuit board including a switch configured to be depressed by a pressing member, and
    a coupling portion that couples the circuit board to the pen pressure detector, the coupling portion provided with a sealing member that closes a gap between the coupling portion and an inner wall of the casing.

15. The electronic pen according to claim 1, wherein the pen pressure detector, in operation, detects a capacitance that changes according to the pen pressure.

16. The electronic pen according to claim 1, wherein:
    a circuit board disposed on a first side of the pen pressure detector, the first side being opposite to a second side of the pen pressure detector, the core body insertion member being disposed on the second side of the pen pressure detector,
    a coupling portion that couples the circuit board to the pen pressure detector,
    a first sealing member that separates the hollow portion of the core body insertion member from the second space,
    a second sealing member that closes a gap between the coupling portion and an inner wall of the casing, and
    a space between the first sealing member and the second sealing member is sealed within the hollow portion of the casing.

17. The electronic pen according to claim 1, wherein a circuit board is disposed on a first side of the pen pressure detector, the first side being opposite to a second side of the pen pressure detector, the core body insertion member being disposed on the second side of the pen pressure detector, and wherein an electronic part mounting surface of the circuit board is covered by a molded member.

* * * * *

UNITED STATES PATENT AND TRADEMARK OFFICE
CERTIFICATE OF CORRECTION

PATENT NO. : 10,802,616 B2  
APPLICATION NO. : 16/441182  
DATED : October 13, 2020  
INVENTOR(S) : Kenichi Ninomiya et al.

Page 1 of 1

It is certified that error appears in the above-identified patent and that said Letters Patent is hereby corrected as shown below:

On the Title Page

Item (72) Inventors:
"Kenichi NINOMIYA, Kanagawa (JP); Takayuki ARAI, Saitama (JP); Kohei TANAKA, Tokyo (JP)"

Should read:
--Kenichi NINOMIYA, Kanagawa (JP); Takayuki ARAI, Saitama (JP), Kohei TANAKA, Tokyo (JP), Takenori KANEDA, Saitama (JP)--

Signed and Sealed this
Fifth Day of August, 2025

Coke Morgan Stewart
*Acting Director of the United States Patent and Trademark Office*